United States Patent
Gass et al.

(10) Patent No.: US 10,089,103 B2
(45) Date of Patent: Oct. 2, 2018

(54) SYSTEMS AND METHODS FOR TRANSFORMATION OF REPORTING SCHEMA

(71) Applicant: smartShift Technologies, Inc., New York, NY (US)

(72) Inventors: Albrecht Gass, Fullerton, CA (US); Nikolaos Faradouris, Mannheim (DE); Oliver Flach, Leinfelden-Echterdingen (DE); Stefan Hetges, Mannheim (DE)

(73) Assignee: SMARTSHIFT TECHNOLOGIES, INC., New York, NY (US)

( * ) Notice: Subject to any disclaimer, the term of this patent is extended or adjusted under 35 U.S.C. 154(b) by 32 days.

(21) Appl. No.: 15/227,556

(22) Filed: Aug. 3, 2016

(65) Prior Publication Data

US 2018/0039490 A1    Feb. 8, 2018

(51) Int. Cl.
*G06F 9/45*    (2006.01)
*G06F 8/65*    (2018.01)

(52) U.S. Cl.
CPC ..................... *G06F 8/65* (2013.01)

(58) Field of Classification Search
CPC ... G06F 8/61; G06F 8/65; G06F 8/427; G06F 8/443
USPC .......................................... 717/168
See application file for complete search history.

(56) References Cited

U.S. PATENT DOCUMENTS

| | | | | |
|---|---|---|---|---|
| 7,711,680 B2 * | 5/2010 | Barnes-Leon | ......... | G06Q 10/06 717/102 |
| 8,572,566 B2 * | 10/2013 | Gass | ......... | G06F 8/71 717/101 |
| 8,898,627 B2 * | 11/2014 | Gass | ......... | G06F 8/65 717/168 |
| 9,811,325 B2 * | 11/2017 | Gass | ......... | G06F 8/51 |
| 2003/0172368 A1 * | 9/2003 | Alumbaugh | ............. | G06F 8/71 717/106 |
| 2005/0010919 A1 * | 1/2005 | Ramanathan | ............. | G06F 8/61 717/174 |

(Continued)

OTHER PUBLICATIONS

Siddiqui et al, "GLARE: A Grid Activity Registration, Deployment and Provisioning Framework", 2005, ACM.*

(Continued)

*Primary Examiner* — Wei Zhen
*Assistant Examiner* — Junchun Wu
(74) *Attorney, Agent, or Firm* — Daniel Rose; Foley & Lardner LLP

(57) ABSTRACT

The present application is directed towards systems and methods for automatically transforming reporting and view database schema during upgrading of a system from a source installation to a target installation. An analyzer executed by a processor of a client device may identify an application of a source installation configured to process a first one or more objects of the source installation. The analyzer may determine that the first one or more objects are modified during upgrading or transformation of the source installation to a target installation. The analyzer may generate a mapping between the first one or more objects of the source installation to a second one or more objects of the target installation, responsive to the determination. A transformer executed by the processor of the client device may modify a schema of the application, according to the generated mapping.

13 Claims, 14 Drawing Sheets

(56) References Cited

U.S. PATENT DOCUMENTS

| | | | | |
|---|---|---|---|---|
| 2005/0120347 | A1* | 6/2005 | Asare | G06F 8/61 |
| | | | | 717/177 |
| 2005/0251797 | A1* | 11/2005 | Omiya | G06F 8/70 |
| | | | | 717/165 |
| 2008/0028390 | A1* | 1/2008 | Fors | G06F 8/61 |
| | | | | 717/174 |
| 2008/0256515 | A1* | 10/2008 | Ponce de Leon | G06F 8/20 |
| | | | | 717/120 |
| 2009/0172637 | A1* | 7/2009 | Parikh | G06F 8/427 |
| | | | | 717/114 |
| 2009/0313601 | A1* | 12/2009 | Baird | G06F 8/34 |
| | | | | 717/106 |
| 2011/0078211 | A1* | 3/2011 | Gass | G06F 8/65 |
| | | | | 707/803 |
| 2011/0282995 | A1* | 11/2011 | Gass | G06F 8/65 |
| | | | | 709/226 |
| 2013/0268927 | A1* | 10/2013 | Cochran | H03M 7/3084 |
| | | | | 717/177 |
| 2014/0208316 | A1* | 7/2014 | Ciano | G06F 9/4856 |
| | | | | 718/1 |
| 2017/0293668 | A1* | 10/2017 | Crabtree | G06F 17/30563 |

OTHER PUBLICATIONS

Carbone et al., "Mapping Kernel Objects to Enable Systematic Integrity Checking", 2009, ACM.*

Vetterli et al.,"Metadata Standards for Data Warehousing: Open Information Model vs. Common Warehouse Metamodel", Sep. 2000, ACM.*

Sethi et al. "Rapid Deployment of SOA Solutions via Automated Image Replication and Reconfiguration", 2008, IEEE.*

* cited by examiner

| View Name 430 | ID 431 | Table(s) 402 | Merge 432A | Merge 432B | Merge 432C | Output 434 | Keys 436 |
|---|---|---|---|---|---|---|---|
| I_AccountingItemList | 1 | TRACT_DOCUMENT | | | | | OS_GUID |
| I_AccountingItemList | 2 | TRACT_ACCITEM | TRACT_DOCUMENT:1 | | | DOCUMENT_GUID = J1.OS_GUID | OS_GUID, ITEM_NUMBER |
| I_AccountingItemList | 3 | TRACT_POSCONTEXT | TRACT_ACCITEM:2 | | | OS_GUID=J1.PC_GUID | OS_GUID |
| I_AccountingItemList | 4 | DIFT_POS_IDENT | TRACT_POSCONTEXT:3 | | | OS_GUID=J1.POS_IDENTIF_OID | OS_GUID |
| I_AccountingItemPayment | 5 | TRPRT_PAYMENTS | TRACT_DOCUMENT:1 | DIFT_POS_IDENT:4 | TRACT_ACCITEM:2 | BUSTRANSID=J1.BUSTRANSID and VALUATION_AREA=J2.VALUATION_AREA and FLOW_NUMBER=J3.TRDFLOWNR | |
| I_AccountingItemPayment | 6 | DD07T | TRPRT_PAYMENTS:6 | | | DOMNAME=TPM_TRPR_RELSTATE and AS4LOCAL='A' and DOMVALUE_L=J1.RELEASE_STATE | |
| I_AccountingItemDetail | 7 | VT8FHA | TRACT_DOCUMENT:1 | DIFT_POS_IDENT:4 | | BUKRS=J2.COMPANY_CODE AND RFHA=COALESCE(J1.DEAL_NUMBER_TM, J2.DEAL_NUMBER) | |

*FIG. 4C*

| Source Table 437 | Mapping 438 | Output Column 440 | Data Element 442 | Description 444 |
|---|---|---|---|---|
| TRACT_ACCITEM:2 | CLIENT | CLIENT | CLIENT | Client |
| TRACT_ACCITEM:2 | DOCUMENT_GUID | DOCUMENT_GUID | TPM_DB_OS_GUID | Object Identity in Database Format |
| TRACT_ACCITEM:2 | ITEM_NUMBER | ITEM_NUMBER | POSNR_ACC | Account Document Line Item Number |
| DIFT_POS_IDENT:4 | OS_GUID | OS_GUID_PI | TPM_DB_OS_GUID | Object Identity in Database Format |
| TRACT_POSCONTEXT:3 | OS_GUID | OS_GUID_PC | TPB_DB_OS_GUID | Object Identity in Database Format |
| TRPRT_PAYMENTS:5 | RELEASE_STATE | RELEASE_STATE | TPM_TRPR_RELSTAT | Release Status for Payment |
| VTBFHA:7 | EXTACC_DEAL | EXT_ACCOUNT | PM_EXT_ACCOUNT | External Account |

*FIG. 4D*

*FIG. 4E*

SYSTEMS AND METHODS FOR TRANSFORMATION OF REPORTING SCHEMA

FIELD OF THE DISCLOSURE

The present application generally relates to analyzing, upgrading, and modernizing an application. In particular, the present application relates to systems and methods for automatically transforming reporting and view database schema during upgrading of a system from a source installation to a target installation.

BACKGROUND OF THE DISCLOSURE

Many software applications may be modified or customized by users or administrators to include additional functions, objects, databases, and customized code. When the underlying software application is upgraded to a new version, in many instances, the modified or customized functions, objects, databases, and code of the prior, obsolete version may be incompatible with the new version. Rewriting the modified or customized functions, objects, databases, and/or code may be time consuming and expensive.

BRIEF DESCRIPTION OF THE FIGURES

The details, objects, aspects, features, and advantages of various embodiments of the invention are set forth in the description below and accompanying drawings, in which:

FIG. 4C is an illustration of an example of table mapping for automated transformation of reporting schema, according to one implementation;

FIG. 4D is an illustration of an example of field mapping for automated transformation of reporting schema, according to one implementation;

FIG. 4E is an example of output transformation code based on the examples of FIGS. 4C and 4D, according to one implementation.

Figure 1A:
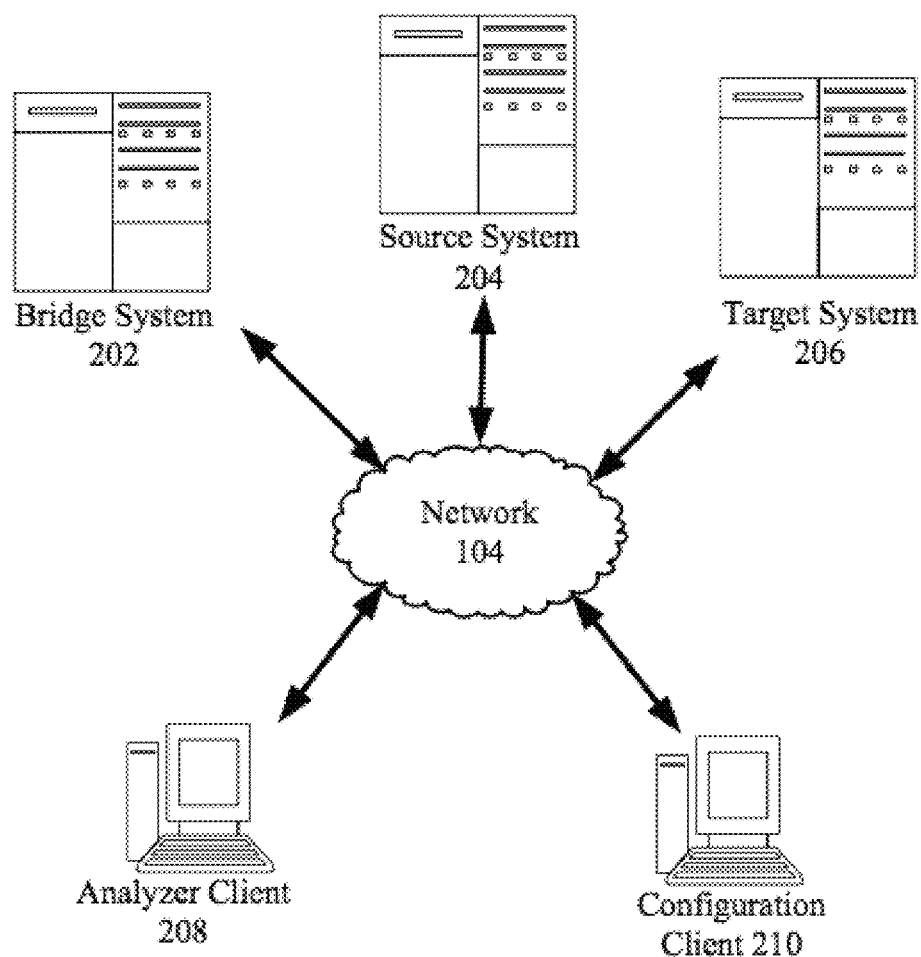
FIG. 1A is a block diagram of an embodiment of a network environment for a client to access a server for analyzing and transforming an application from a source installation to a target installation.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

The present application is directed towards systems and methods for automatically transforming reporting and view database schema during upgrading of a system from a source installation to a target installation. The class of software systems and corresponding market segment referred to as Enterprise Resource Planning (ERP) is characterized by systems and applications of extremely large breadth and scope of functionality, designed to coordinate, control, and support resources and information related to business processes such as manufacturing, supply chain management, financials, projects, human resources and customer relationship management from a shared data store for an entire enterprise. The inherently large scope and complexity of ERP systems poses significant challenges to modernization. Business owners must balance significant business and technical benefits of updating and modernizing these vast systems against the considerable costs, risks, and disruption associated with large-scale modernization projections.

One example of an ERP system is the Systems, Applications, and Products (SAP) system developed by SAP AG of Walldorf, Germany. SAP uses a proprietary system architecture and programming language, the Advanced Business Application Programming (ABAP) language, which includes the concept of Logical Databases (LDBs). SAP is prominent in the market, and this has spawned an industry sub-niche for providers of specialized services and solutions related to SAP systems. Services and solutions serving the SAP ERP market segment must be extremely knowledgeable about, and closely aligned with, the underlying framework, architecture, and programming language of SAP systems, from both technical and business perspectives.

ERP systems may be highly customized, with code objects, executables, resources, and libraries developed on an installation-specific basis to perform various functions needed by the company. For example, one company's programmers may create modules for field sales agents to enter invoices and manage product distribution to customers directly. Another company may not have field sales agents and have no need for such a function, but instead create a module to manage worldwide shipping manifests between production sites. Users may interact with these modules via custom applications, sometimes referred to as views or reports, which provide an interface through which a user can enter or retrieve data, perform queries or searches, or otherwise interact with other code objects or resources.

ERP systems may be periodically updated, with a manufacturer providing new database or backend code and libraries for installation. While default objects, libraries, and modules may be provided by the manufacturer with the new installation, custom code objects may need to be upgraded or modified to work properly. For example, new naming conventions in a new version of the system (e.g. case-sensitivity or -insensitivity, unicode-compliance, etc.) may require modification and upgrading of custom code objects that worked with an older version of the system to account for the new conventions. Similarly, new features may be provided that may provide more efficient code structures (e.g. "while" loops rather than mere "if-then" conditions), other features may be removed or obsoleted, or other changes made to the underlying structure of the ERP system.

Rather than require extensive manual rewriting of these code objects, the systems and methods described herein provide for automatic identification, analysis, and transformation of customized objects from a source installation to a target installation of a system. A meta-model may be constructed based on associations between different code objects in the source installation, and transformation rules applied to the meta-model. New associations may be identified between code objects based on the transformed meta-model, and the objects may be automatically modified to remain compliant and functional in the target installation.

As custom objects are modified, custom interfaces or applications such as views and reports that read and/or write data to and from custom objects may need to be similarly modified in order to remain functional. These customizations may be complex as various objects are split or joined relative to the source installation during transformation. Accordingly, the systems and methods described herein also provide for automatically transforming reporting and view database schema during upgrading of a system from a source installation to a target installation.

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for analyzing and transforming an application from a source installation to a target installation; and Section C describes embodiments of systems and methods for automatically transforming reporting and view database schema during upgrading of a system from a source installation to a target installation.

A. Network and Computing Environment

Prior to discussing the specifics of embodiments of the systems and methods of the solution of the present disclosure, it may be helpful to discuss the network and computing environments in which such embodiments may be deployed. Referring now to FIG. 1A, an embodiment of a network environment 101 is depicted. In brief overview, the network environment 101 comprises one or more systems 202-206 in communication with one or more clients 208-210 (also generally referred to as remote machine(s) 106) via one or more networks 104. Specifically shown are a bridge system 202, a source system 204, a target system 206, an analyzer client 208, and a configuration client 210. In some embodiments, analyzer client 208 and configuration client 210 may be the same client. In other embodiments, bridge system 202 may be combined with analyzer client 208 and/or configuration client 210. In yet another embodiment, bridge system 202 may be combined with either source system 204 or target system 206. In some embodiments, a client 208-210 communicates with a server 202-206 via an intermediary appliance (not shown), such as a firewall, a switch, a hub, a NAT, a proxy, a performance enhancing proxy, a network accelerator, a modem, or other network device of any form or type.

As shown in FIG. 1A, the network 104 can be a local-area network (LAN), such as a company Intranet, a metropolitan area network (MAN), or a wide area network (WAN), such as the Internet or the World Wide Web. Although not illustrated, network 104 may comprise one or more networks, coupled either directly or via one or more intermediaries. In one embodiment, network 104 may be a private network. In another embodiment, network 104 may be a public network. In some embodiments, network 104 may be a combination of one or more private networks and one or more public networks. In some embodiments, clients 208-210 may be located at a branch office of a corporate enterprise communicating via a WAN connection over the network 104 to the systems 202-206 located at a corporate data center.

The network 104 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 may be a bus, star, or ring network topology. The network 104 and network topology may be of any such network or network topology as known to those ordinarily skilled in the art capable of supporting the operations described herein.

As shown in FIG. 1A, bridge system 202 may be a server or workstation, configured to include a solution manager 212 and/or a collection agent 214, discussed in more detail below. As discussed above, although illustrated as a separate entity, bridge system 202 may be part of or combined with either or both of analyzer client 208 and configuration client 210.

Source system 204 may also be referred to as a source installation 204. In some embodiments, source system or source installation 204 may comprise a server or workstation with an installation or configuration of a version of one or more applications. In one embodiment, the one or more applications may also include an operating system. In another embodiment, the one or more applications may comprise an enterprise resource planning (ERP) software, such as SAP Business Suite, SAP R/3, or SAP High-Performance Analytic Appliance (HANA), manufactured by SAP AG of Walldorf, Germany; Microsoft Dynamics, manufactured by Microsoft Corporation of Redmond, Wash.; PeopleSoft, manufactured by Oracle Corporation of Redwood Shores, Calif.; or any other type and form of enterprise or manufacturing resource planning software. In another embodiment, the one or more applications may comprise any application that comprises an installation in a predetermined state, and modifications to objects from the predetermined state. In an example of such an embodiment, a default installation of an ERP application may be installed on source installation 204. To account for specific needs of the business or industry, the installation may be modified, with custom objects, code, or functions for performing additional tasks or managing additional resources not foreseen by the manufacturer of the ERP application. In another embodiment, the source system or source installation may comprise any type or form of application containing modifications from an initial or default state.

An installation in a predetermined state may comprise any type and form of version, installation and/or state of configuration, modernization or customization of the same at any point during development, deployment or maintenance of the application. In some embodiments, the predetermined state may be an initial or default installation of an application. In some embodiments, the predetermined state may be the initial or default installation of a version of an application with a set of one or more configurations, customizations or extensions. In some embodiments, the predetermined state may be any version of an application with a set of one or more configurations, customizations or extensions. In other embodiments, the predetermined state may be any version that has been upgraded or transformed using any of the systems and methods described herein. In some embodiments, the predetermined state may be any point of configuration or customization of a version of an application, whether complete, in-process or otherwise. For example, a predetermined state of an application may be any set point in development, configuration or customization of an application. For example, the systems and methods described herein may be used to transform the configuration or customization during the development phases before the final customizations or configurations are deployed for production.

Target system 206 may also be referred to as a target installation 206. In some embodiments, target system or target installation 206 may comprise a server or workstation with an installation or configuration of a second version of one or more applications. In some embodiments, the second version may be similar to the first version of one or more applications on source system 204. As described above, source system 204 may comprise custom objects, codes or functions. Using the methods and systems described herein, target system 206 may be efficiently modified to comprise the custom objects, codes or functions of source system 204. In some embodiments, target system 206 may comprise additional modifications to allow the custom objects, codes or functions to execute or interact properly with the second version of the one or more applications. For example, a company with an existing source system 204 may wish to upgrade to a new version of an underlying application on a target system 206. The existing source system 204 may have modifications and custom objects that the company wishes to include on target system 206. In some embodiments, custom objects and code may be directly transferred and will perform without error on target system 206. However, in many embodiments, the custom objects and code may need further modifications, due to differences between the underlying application of target system 206 and source system 204.

Also shown in FIG. 1A are analyzer client 208 and configuration client 210. Although shown as separate clients, in some embodiments, analyzer client 208 and configuration client 210 may be combined, and/or may be combined with bridge system 202. Analyzer client 208 and configuration client 210 may each be a workstation, client, or server. In some embodiments, analyzer client 208 is configured with or executes an analysis agent 228 and/or transformer 230, described in more detail below. In some embodiments, configuration client 210 is configured with or executes a configuration agent 232 and/or a manual conversion agent 234, described in more detail below.

The bridge system 202, source system 204, target system 206, analyzer client 208 and configuration client 210 may be deployed as and/or executed on any type and form of computing device, such as a computer, network device or appliance capable of communicating on any type and form of network and performing the operations described herein. Furthermore, although only one each of systems 202-210 are illustrated, in many embodiments, the systems may each comprise one or more physical and/or virtual machines, such as a server cloud, server farm, cloud of virtual machines executed by one or more physical machines, etc.

Figure 1B:
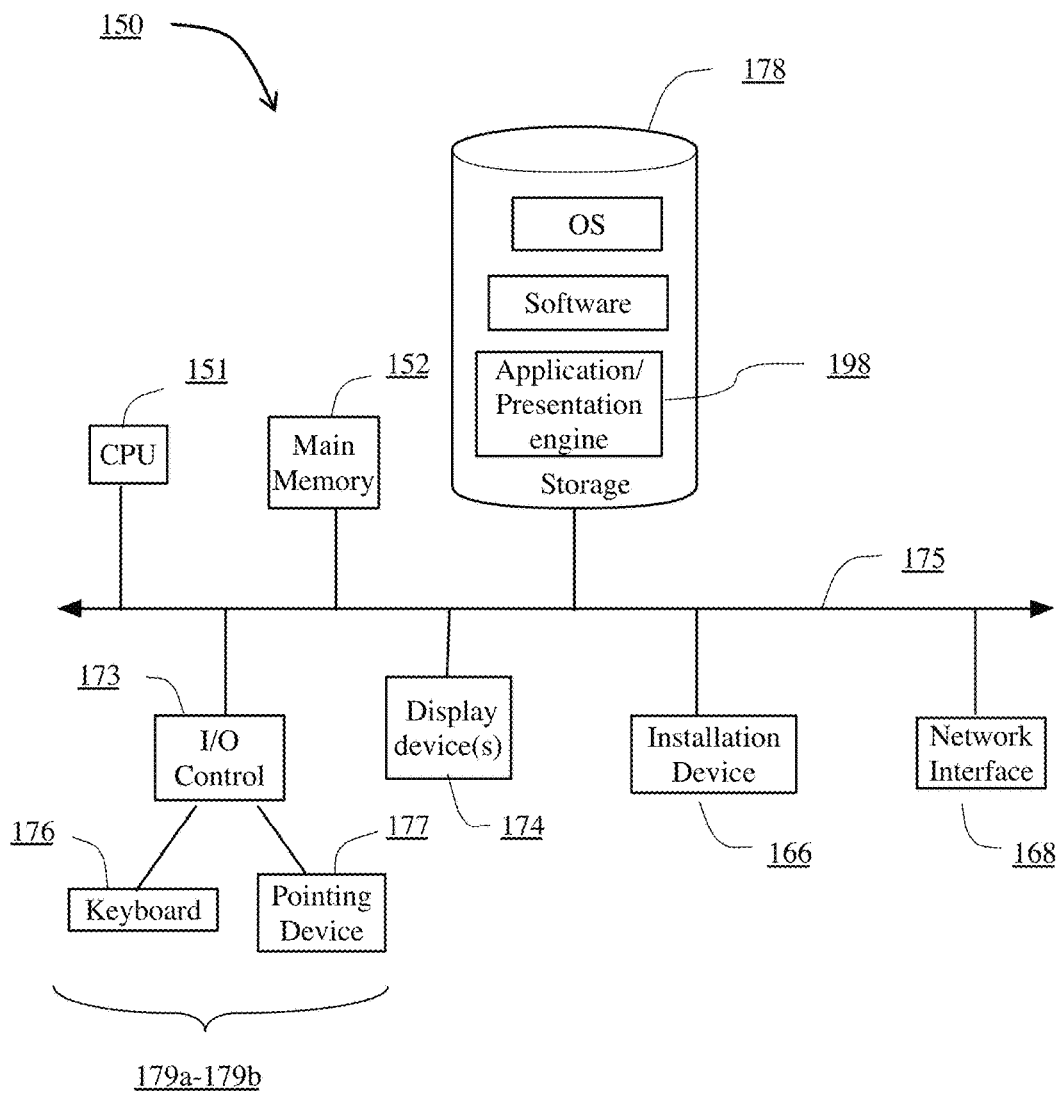
FIG. 1B is a block diagram of an embodiment of a computing device.

FIG. 1B is a block diagram of an exemplary computing device useful for practicing the methods and systems described herein. The various devices and servers may be deployed as and/or executed on any type and form of computing device, such as a computer, network device or appliance capable of communicating on any type and form of network and performing the operations described herein. The computing device may comprise a laptop computer, desktop computer, virtual machine executed by a physical computer, tablet computer, such as an iPad tablet manufactured by Apple Inc. or Android-based tablet such as those manufactured by Samsung, Inc. or Motorola, Inc., smart phone or PDA such as an iPhone-brand/iOS-based smart phone manufactured by Apple Inc., Android-based smart phone such as a Samsung Galaxy or HTC Droid smart phone, or any other type and form of computing device. FIG. 1B depicts a block diagram of a computing device 150 useful for practicing an embodiment of the bridge system 202, source system 204, target system 206, analyzer client 208, or configuration client 210. A computing device 150 may include a central processing unit 151; a main memory unit 152; a visual display device 174; one or more input/output devices 179a-179b (generally referred to using reference numeral 179), such as a keyboard 176, which may be a virtual keyboard or a physical keyboard, and/or a pointing device 177, such as a mouse, touchpad, or capacitive or resistive single- or multi-touch input device; and a cache memory (not illustrated) in communication with the central processing unit 151, which may be connected via a bus 175.

The central processing unit 151 is any logic circuitry that responds to and processes instructions fetched from the main memory unit 152 and/or storage 178. The central processing unit may be provided by a microprocessor unit, such as: those manufactured by Intel Corporation of Santa Clara, Calif.; those manufactured by Motorola Corporation of Schaumburg, Ill.; those manufactured by Apple Inc. of Cupertino Calif., or any other single- or multi-core processor, or any other processor capable of operating as described herein, or a combination of two or more single- or multi-core processors. Main memory unit 152 may be one or more memory chips capable of storing data and allowing any storage location to be directly accessed by the microprocessor 151, such as random access memory (RAM) of any type. In some embodiments, main memory unit 152 may include cache memory or other types of memory.

The computing device 150 may support any suitable installation device 166, such as a floppy disk drive, a CD-ROM drive, a CD-R/RW drive, a DVD-ROM drive, tape drives of various formats, USB/Flash devices, a hard-drive or any other device suitable for installing software and programs such as a social media application or presentation engine, or portion thereof. The computing device 150 may further comprise a storage device 178, such as one or more hard disk drives or redundant arrays of independent disks, for storing an operating system and other related software, and for storing application software programs such as any program related to the social media application or presentation engine.

Furthermore, the computing device 150 may include a network interface 168 to interface to a Local Area Network (LAN), Wide Area Network (WAN) or the Internet through a variety of connections including, but not limited to, standard telephone lines, LAN or WAN links (e.g., Ethernet, T1, T3, 56 kb, X.25), broadband connections (e.g., ISDN, Frame Relay, ATM), wireless connections, (802.11a/b/g/n/ ac, BlueTooth), cellular connections, or some combination of any or all of the above. The network interface 168 may comprise a built-in network adapter, network interface card, PCMCIA network card, card bus network adapter, wireless network adapter, USB network adapter, cellular modem or any other device suitable for interfacing the computing device 150 to any type of network capable of communication and performing the operations described herein.

A wide variety of I/O devices 179a-179n may be present in the computing device 150. Input devices include keyboards, mice, trackpads, trackballs, microphones, drawing tablets, and single- or multi-touch screens. Output devices include video displays, speakers, headphones, inkjet printers, laser printers, and dye-sublimation printers. The I/O devices 179 may be controlled by an I/O controller 173 as shown in FIG. 1B. The I/O controller may control one or more I/O devices such as a keyboard 176 and a pointing device 177, e.g., a mouse, optical pen, or multi-touch screen. Furthermore, an I/O device may also provide storage 178 and/or an installation medium 166 for the computing device 150. The computing device 150 may provide USB connections to receive handheld USB storage devices such as the USB Flash Drive line of devices manufactured by Twintech Industry, Inc. of Los Alamitos, Calif.

The computing device 150 may comprise or be connected to multiple display devices 174a-174n, which each may be of the same or different type and/or form. As such, any of the I/O devices 179a-179n and/or the I/O controller 173 may comprise any type and/or form of suitable hardware, software embodied on a tangible medium, or combination of hardware and software to support, enable or provide for the connection and use of multiple display devices 174a-174n by the computing device 150. For example, the computing device 150 may include any type and/or form of video adapter, video card, driver, and/or library to interface, communicate, connect or otherwise use the display devices 174a-174n. A video adapter may comprise multiple connectors to interface to multiple display devices 174a-174n. The computing device 150 may include multiple video adapters, with each video adapter connected to one or more of the display devices 174a-174n. Any portion of the operating system of the computing device 150 may be configured for using multiple displays 174a-174n. Additionally, one or more of the display devices 174a-174n may be provided by one or more other computing devices, such as computing devices 150a and 150b connected to the computing device 150, for example, via a network. These embodiments may include any type of software embodied on a tangible medium designed and constructed to use another computer's display device as a second display device 174a for the computing device 150. One ordinarily skilled in the art will recognize and appreciate the various ways and embodiments that a computing device 150 may be configured to have multiple display devices 174a-174n.

A computing device 150 of the sort depicted in FIG. 1B typically operates under the control of an operating system, such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein.

The computing device 150 may have different processors, operating systems, and input devices consistent with the device. For example, in one embodiment, the computer 150 is an Apple iPhone or Motorola Droid smart phone, or an Apple iPad or Samsung Galaxy Tab tablet computer, incorporating multi-input touch screens. Moreover, the computing device 150 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, a first computing device 100a executes an application on behalf of a user of a client computing device 100b. In other embodiments, a computing device 100a executes a virtual machine, which provides an execution session within which applications execute on behalf of a user or a client computing devices 100b. In one of these embodiments, the execution session is a hosted desktop session. In another of these embodiments, the computing device 100 executes a terminal services session. The terminal services session may provide a hosted desktop environment. In still another of these embodiments, the execution session provides access to a computing environment, which may comprise one or more of: an application, a plurality of applications, a desktop application, and a desktop session in which one or more applications may execute.

Figure 2A:
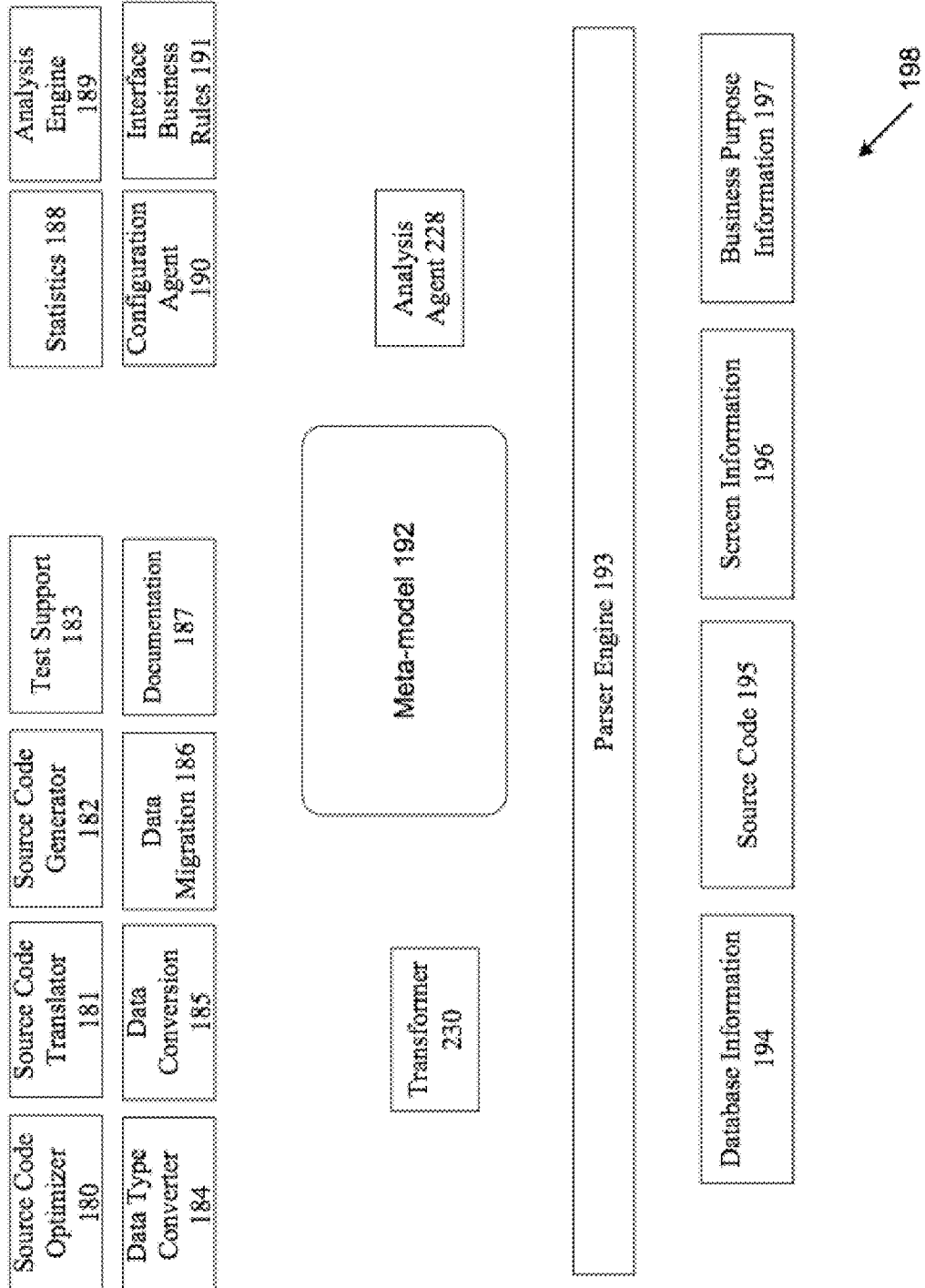
FIG. 2A is a block diagram of an embodiment of a suite of applications for analyzing and transforming an application from a source installation to a target installation.

B. Systems and Methods for Analyzing and Transforming an Application from a Source Installation to a Target Installation FIG. 2A illustrates a block diagram of an embodiment of a suite of applications and data types for analyzing and transforming an application from a source installation to a target installation. In brief, FIG. 2A shows a source code optimizer 180, source code translator 181, source code generator 182, test support engine 183, a data type converter 184, agents for data conversion 185 and data migration 186, and documentation 187. Together, blocks 180-187 comprise agents of transformer 230. Similarly, statistics data 188, analysis engine 189, configuration agent 190 and interface business rules 191 comprise agents of analysis agent 228. Meta-model 192 interacts with both the analysis agent 228 and transformer 230, and is established by parser engine 193. Additional data types are available, such as database information 194, source code 195, screen information 196, and business purpose information 197.

Figure 2B:
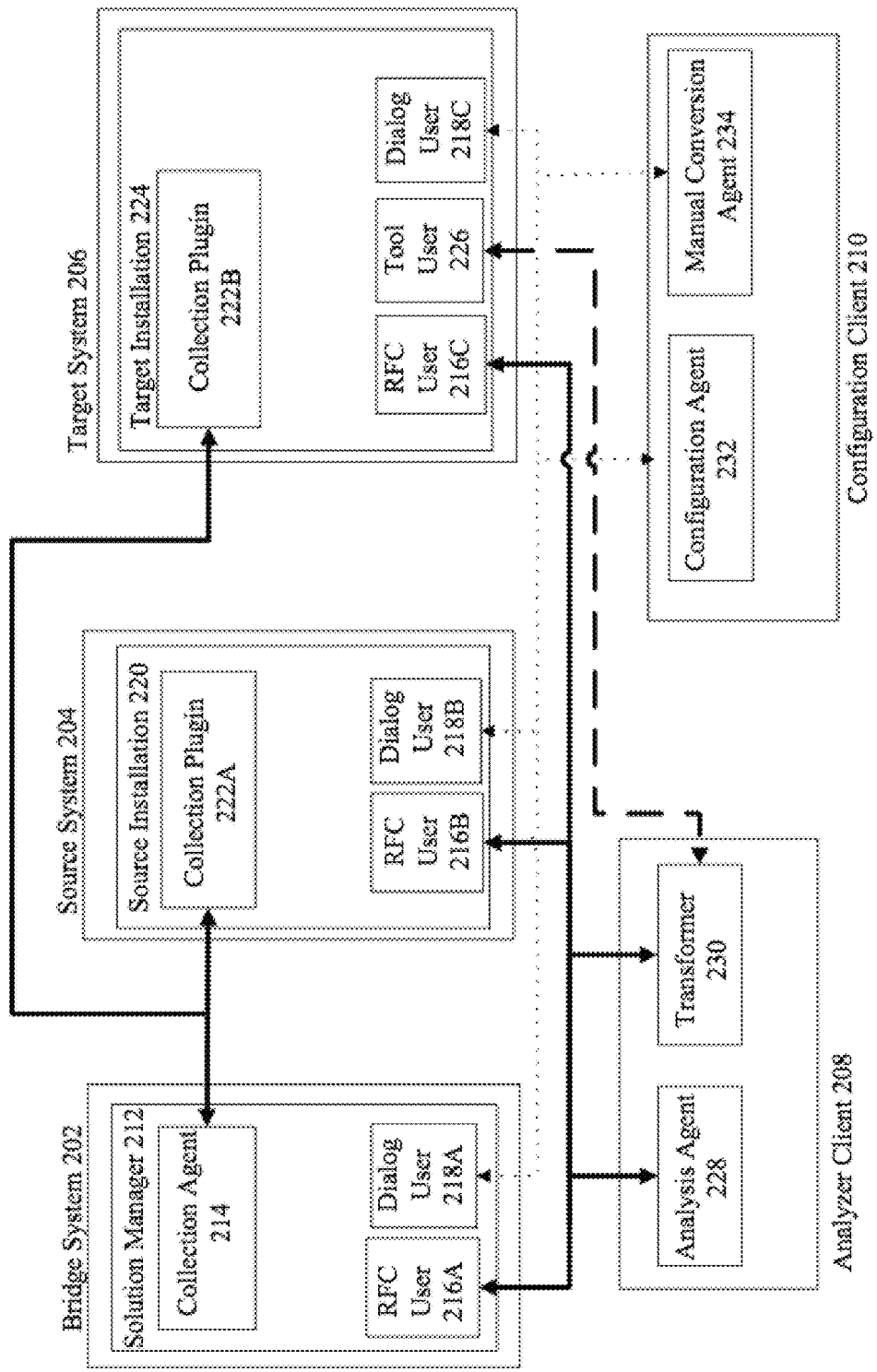
FIG. 2B is a block diagram of an embodiment of an appliance for analyzing and transforming an application from a source installation to a target installation.

Shown in FIG. 2B is a block diagram of another embodiment of a system for analyzing and transforming an application from a source installation to a target installation. In brief, bridge system 202 may be configured with a solution manager 212, which may include a collection agent 214 and may be configured with a remote function call (RFC) user account 216A and a dialog user account 218A. Source system 204 may be configured with a source installation 220, which may include a collection plug-in 222A. Source installation 220 may also be configured with an RFC user account 216B and a dialog user account 218B. Target system 206 may be configured with a target installation 224, which may include a collection plug-in 222B. Target installation 220 may also be configured with an RFC user account 216C, a dialog user account 218C, and a tool user account 226. As shown, analyzer client 208 may be configured with an analysis agent 228 and a transformer 230. Configuration client 210 may be configured with a configuration agent 232 and a manual conversion agent 234. In one embodiment, the collection agent 214 is able to communicate with collection plug-ins 222A and 222B via a network 104. As shown, in some embodiments, analysis agent 228 and transformer 230 may be configured to use RFC user accounts 216A-216C for communicating with systems 202-206. Transformer 230 may also be configured to use tool user account 226. Additionally, in some embodiments, configuration agent 232 and manual conversion agent 234 may be configured to use dialog user accounts 218A-218C.

Still referring to FIG. 2B and in more detail, in some embodiments, bridge system 202 may be configured with or may execute a solution manager 212. In some embodiments, solution manager 212 may be an application, process, agent, function, routine, logic, or any type and form of executable instructions for snapshotting an installation. In some embodiments, snapshotting or providing a snapshot of an installation comprises scanning and downloading components and/or associations of an installation of an application, such as source installation 220. Snapshotting may also be referred to variously as saving, capturing, imaging, or storing an image, copy or an instance of an installation. In additional embodiments, solution manager 212 may further comprise functions for compressing a snapshotted image. In still further embodiments, solution manager 212 may comprise or be associated with a storage medium capable of storing a snapshotted image. In one embodiment, solution manager 212 may connect via a network to a source installation 220, described in more detail below. The solution manager 212 may create a local copy of the entire source installation 220, or, in some embodiments, may parse the source installation 220 and copy a selected subset of the installation. For example, in one such embodiment, solution manager 212 may parse the source installation 220 for custom objects or code modified from a predetermined state of the source installation, and store only a copy of the custom objects or code. In another such embodiment, solution manager 212 may determine a difference between source installation 220 and target installation 224 and store only the difference.

In many embodiments, solution manager 212 further comprises functionality for identifying an object as being in a predetermined state or being in a modified state. For example, an object that has not been customized may, in some embodiments, be considered to be in a predetermined state. A predetermined state of an installation, in such embodiments, may be the state of the installation prior to customization or addition of custom objects, functions, or code. In further embodiments, solution manager 212 may comprise functionality for identifying an object as an asset within-scope, such as a program, a database, or a screen, or an asset out-of-scope, such as a task-management system, a scheduler, an interface, a peripheral system, or a development environment. In yet further embodiments, solution manager 212 may comprise functionality for storing the identification of objects in a database, index, or list, which may be referred to as a worklist. In some embodiments, this worklist may be sent to the analyzer client 208, described in more detail below.

In many embodiments, solution manager 212 further comprises functionality for checking an object or code for compliance with a language syntax 282 and/or semantic rules 284. For example, an object or code modified with custom programming may no longer be compliant with a standard syntax. In such a case, solution manager 212 may identify the object as being not in compliance. In another embodiment, an object or code may be modified, but still be compliant with a standard syntax. In such a case, solution manager 212 may identify the object as being compliant.

In some embodiments, as shown in FIG. 2B, solution manager 212 may comprise or include a collection agent 214. Collection agent 214 may be an application, process, agent, function, routine, logic, or any type and form of executable instructions for downloading or copying all or part of a source installation 220 to bridge system 202. In some embodiments, collection agent 214 connects via a network to a collection plugin 222A and/or collection plugin 222B, described in more detail below. Collection agent 214 may, in some embodiments, comprise functions for downloading source installation data as described above. In further embodiments, collection agent 214 and collection plugins 222A and 222B may be a standard application type or comply with a standard application type and be executed by the source installation 220 and/or target installation 224 without necessary modifications.

As shown in FIG. 2B, solution manager 212, source installation 220 and target installation 224 may include user accounts, such as Remote Function Call (RFC) users 216A-216C, Dialog users 218A-218C, and Tool user 226. RFC users 216A-216C (referred to generally as RFC user(s) 216) may be an account with authentication features, such as a login name and password or other security methods, and privileges allowing the account to get data from and insert data into source installation 220 and/or target installation 224. In some embodiments, data inserted or retrieved from an installation may comprise objects, code, or functions. In some embodiments, RFC users 216 may also be referred to as System or Communication users. Additionally, while referred to generally as RFC users, in many implementations, user accounts may communicate with the source installation, target installation, bridge systems, or other devices via an RFC protocol, via JavaScript Object Notation (JSON), Simple Object Access Protocol (SOAP), a Representational State Transfer (REST) application programming interface (API), via an exchange of XML data, or any other type and form of communication interface. In further embodiments, the Dialog users 218A-218C (referred to generally as Dialog user(s) 218) may be an account with authentication features, similar to those mentioned with regard to RFC users 216, and privileges allowing the account to interact with programs and functions of source installation 220 and/or target installation 224. In some embodiments, a dialog user 218 may have fewer privileges or more limited access than an RFC user 216. In additional embodiments, the Tool user 226 may be an account with authentication features, similar to those mentioned with regard to RFC users 216 and Dialog users 218, and privileges allowing the account to use modification tools on target installation 224.

As shown in FIG. 2B, source system 204 may comprise a source installation 220. As discussed above, in connection with the discussion of source system 204, source installation 220 may be an installation or configuration of a version of one or more applications. In one embodiment, the one or more applications may comprise an enterprise resource planning (ERP) software, such as SAP Business Suite or SAP R/3, manufactured by SAP AG of Walldorf, Germany; Microsoft Dynamics, manufactured by Microsoft Corporation of Redmond, Wash.; PeopleSoft, manufactured by Oracle Corporation of Redwood Shores, Calif.; or any other type and form of enterprise or manufacturing resource planning software. In another embodiment, the one or more applications may comprise any application that comprises a default or initial installation in a predetermined state, and modifications to objects from the default state. In yet another embodiment, the source system or source installation may comprise any type or form of application containing modifications from an initial or default state. As shown, source installation 220 may include one or more RFC users 216 and/or dialog users 218, discussed above.

Additionally, source installation 220 may include or be configured with a collection plugin 222A (generally referred to as a collection plugin 222). Collection plugins 222 may comprise logic, services, hooking functions, routines, or any other type and form of function for gathering data of an installation, such as source installation 220 or target installation 224. In some embodiments, collection plugins 222 may further comprise functions for snapshotting or recording an image of an installation as the installation exists at a certain point in time. In some embodiments, collection plugins 222 may include the ability to push data over a network to collection agent 214, while in other embodiments, collection agent 214 may pull data from the collection plugins.

Target system 206 may comprise a target installation 224. As discussed above, in connection with the discussion of target system 206, target installation 224 may be an installation or configuration of a second or subsequent version of one or more applications, such as a version similar to but different from a previous version of one or more applications on source system 204. As described above, source installation 220 may comprise custom objects, codes or functions. Using the methods and systems described herein, target installation 224 may be efficiently modified to comprise the custom objects, codes or functions of source installation 220. In some embodiments, target installation 224 may comprise additional modifications to allow the custom objects, codes or functions to execute or interact properly with the second version of the one or more applications. As shown, in some embodiments, target installation 224 may include or comprise a collection plugin 222B, and may include or be configured with accounts for RFC User 216C, Dialog User 218C, and Tool user 226, discussed above.

As shown, analyzer client 208 may comprise or include an analysis agent 228 and/or a transformer 230. Analysis agent 228 may comprise one or more applications, logic, functions, services, routines or executable instructions of any type or form, for parsing a first and/or a second installation of an application and creating a meta-model, described in more detail below. In some embodiments, analysis agent 228 comprises functions for downloading system objects identified by the solution manager 212 for transformation. In additional embodiments, analysis agent 228 comprises functions for parsing the source code of programs, databases, screens, task management systems, schedulers, interfaces, peripheral systems, development environments, and other libraries for keywords, functions, objects, or code corresponding to a defined language and syntax. In further embodiments, analyzer client 208 may comprise functions for detecting syntax and language violations. In one such embodiment, analyzer client 208 may comprise functions to categorize or identify the object, responsive to detected violations, as available for automatic upgrade, semi-automatic upgrade, or manual upgrade. In an additional embodiment, analyzer client 208 may comprise functionality for presenting the categorized objects and/or meta-model to a user or administrator. In some such embodiments, presenting the objects and or meta-model may comprise creating and presenting a report, and may include analysis of severity of required upgrades, expected processing time, percentage of upgrade that may be performed automatically, and/or cost to perform upgrading of the source installation.

In some of the embodiments described herein, a system or method may be described as automatic, semi-automatic or manual. An automatic system or method may be such a system or method that performs any of the upgrades, transformations or conversion described herein without any user input during the upgrade, transformation or conversion or with a level of user input below a predetermined threshold. A semi-automatic system or method may be such a system or method that performs any of the upgrades, transformations or conversion described herein with combination of a level of automation and a level of user input during the upgrade, transformation or conversion below a predetermined threshold or within a predetermined threshold range. A manual system or method may be such a system or method that performs any of the upgrades, transformations or conversion described herein without automation during the upgrade, transformation or conversion or with a level of automation below a predetermined threshold. In addition, in the description herein, objects or code of a system may be referred to as comprising automatic code; comprising semi-automatic code; or comprising manual code. Similar to the systems and methods described above, automatic code may be upgraded, transformed or converted without any user input during the upgrade, transformation, or conversion. Semi-automatic code may be upgraded, transformed or converted with a combination of a level of automation and a level of user input during the upgrade, transformation, or conversion below a predetermined threshold or within a predetermined threshold range. Manual code may be upgraded, transformed, or converted without automation during the upgrade, transformation or conversion or with a level of automation below a predetermined threshold.

Transformer 230 may comprise one or more applications, logic, functions, services, routines or executable instructions of any type or form, for transforming a meta-model from one corresponding to one installation of an application, to one corresponding to another installation of an application, such as between a first and second or subsequent installation of the application. In some embodiments, transforming a meta-model comprises applying rules for modifying an object from a syntax or code language associated with the first installation to a syntax or code language associated with the second installation. For example, in one embodiment, a first language may include a function for allowing text input into a database. The second language may include a similar function, but add different possible text encodings, such as Unicode Transformation Format (UTF)-8 or punycode. In such an embodiment, the transformer 230 may apply a rule indicating to add a default encoding type to the function. Thus, the object utilizing the function may then be used by the second installation with the second language and syntax. In some embodiments, transformer 230 further comprises functions for error checking transformed objects for compliance with rules, language, and/or syntax standards. In another embodiment, transformer 230 further comprises functions for uploading transformed objects to target installation 224.

As shown, analysis agent 228 and transformer 230 may, in some embodiments, be configured to use RFC users 216A-216C on the solution manager 212, source installation 220, and target installation 224, respectively. This may enable analysis agent 228 and transformer 230 to retrieve and input data, code, and objects from and to these three systems. In a further embodiment, transformer 230 may be configured to use tool user 226 on target installation 224.

This may enable transformer 230 to interact with system objects of the target installation 224 that an RFC user may not be privileged to modify.

Also shown in FIG. 2B, configuration client 210 may, in some embodiments, comprise a configuration agent 232 and/or a manual conversion agent 234. In some embodiments, configuration agent 232 and manual conversion agent 234 may be configured to use Dialog Users 218A-218C, as shown. This may enable a user or administrator interacting with configuration agent 232 and/or manual conversion agent 234 to further interact with solution manager 212, source installation 220, and/or target installation 224. In an embodiment not illustrated, configuration agent 232 and/or manual conversion agent 234 may also control or interact with analysis agent 228 and/or transformer 230 for the purpose of modifying their settings.

Configuration agent 232 may comprise one or more applications, routines, services, functions or executable instructions of any form or type for configuring a rules engine 248, discussed in more detail below. In other embodiments, configuration agent 232 may comprise functions for configuring solution manager 212, source installation 220, and/or target installation 224. For example, in one such embodiment, configuration agent 232 may configure the solution manager 212 to only scan certain databases when snapshotting and categorizing objects.

Manual conversion agent 234 may comprise one or more applications, routines, services, functions or executable instructions of any form or type for allowing a user or administrator to perform modifications to objects categorized for semi-automatic or manual upgrade. In some embodiments, manual conversion agent 234 may present a dialog to a user, indicating the object to be upgraded, and a language or syntax issue that could cause an error if the object is installed in target installation 224. In some embodiments, manual conversion agent 234 may also present suggested modifications to the object, based on rules applied by the analysis agent 228. In further embodiments, manual conversion agent 234 may comprise functions for modifying the object, responsive to an instruction from the user. In a further embodiment, manual conversion agent 234 may comprise functions for uploading the modified object to target installation 224 and/or analyzer client 208. In one example embodiment, the manual conversion agent 234 may present a dialog to a user indicating that an object of the source installation, when upgraded to the target installation, may perform an illegal operation due to differences in syntax, such as dividing by a variable that has been set to zero. The user may instruct the manual conversion agent 234 to make a modification, such as changing the value of the variable, or directing the operation to a different variable.

Figure 2C:
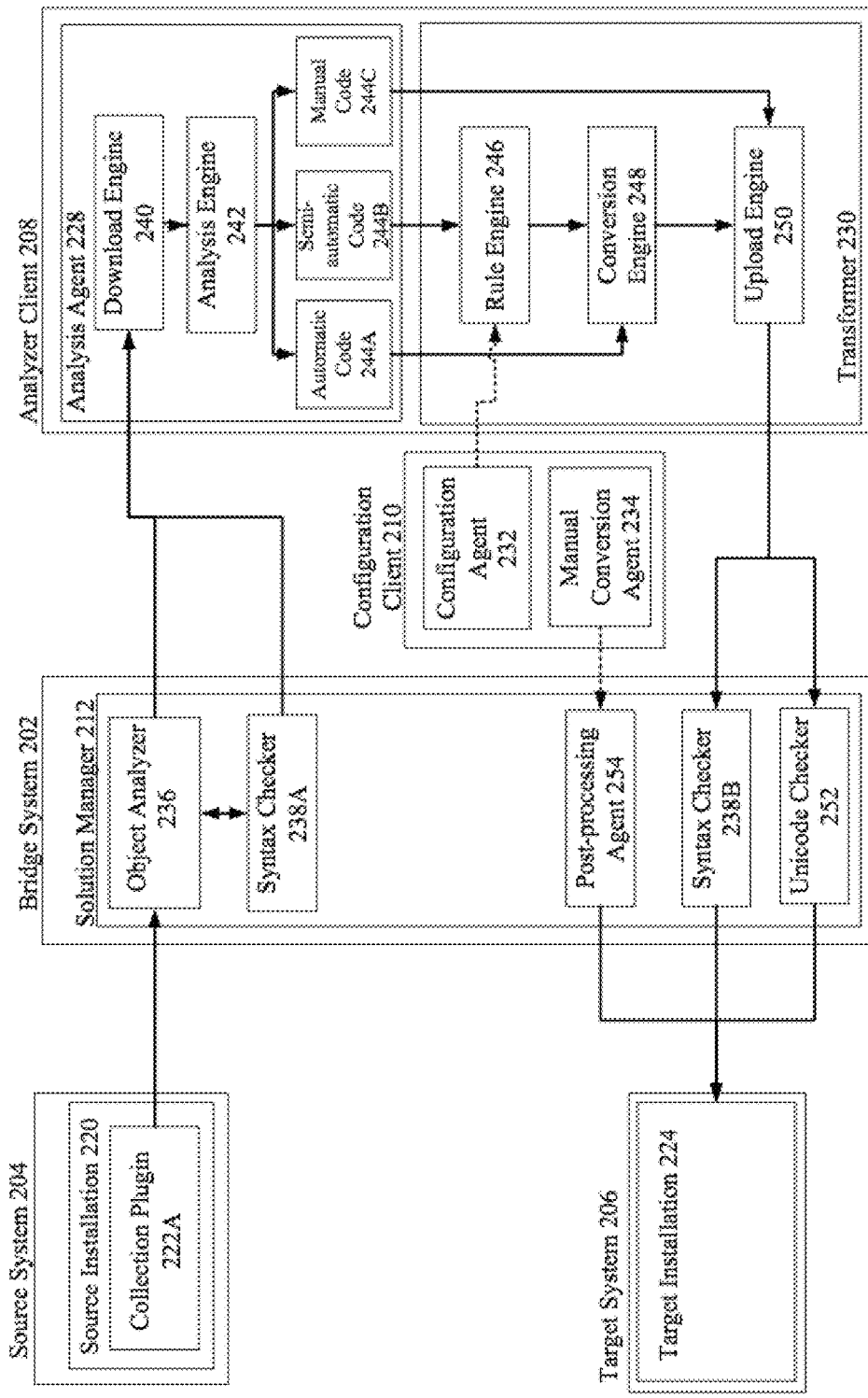
FIG. 2C is block diagram of another embodiment of an appliance for analyzing and transforming an application from a source installation to a target installation.

Shown in FIG. 2C is another embodiment of a system for analyzing and transforming an application from a source installation to a target installation. In brief, source system 204 may comprise a source installation 220 and collection plugin, 222A, discussed above. Bridge system 202 may comprise a solution manager 212, discussed above, which may comprise an object analyzer 236, syntax checkers 238A-238B, unicode checker 252 and post-processing agent 254. Analyzer client 208 may comprise an analysis agent 228, which may further comprise a download engine 240 and an analysis engine 242. The analysis engine may categorize code as automatic code 244A, semi-automatic code 244B, or manual code 244C. Semi-automatic code 244B is passed to a rule engine 246 configured on transformer 230. Rule engine 246 may apply rules to the semi-automatic code 244B, and pass the code to conversion engine 248. Automatic code 244A is passed from the analysis agent 228 to the conversion engine 248. Automatic code 244A and semi-automatic code 244B are passed from the conversion engine 248 to the upload engine 250. The upload engine 250 may upload converted automatic code 244A and semi-automatic code 244B and unconverted manual code 244C to bridge system 202 and solution manager 212. Configuration client 210 may comprise a configuration agent 232, which may configure rule engine 246 of transformer 230, and a manual conversion agent 234, which may interact with post-processing agent 254 of solution manager 212. Although not shown, solution manager 212 may, in some embodiments, comprise an upload engine 250' for transmitting processed and converted code to target installation 224 of target system 206.

Still referring to FIG. 2C and in more detail, solution manager 212 may be configured with an object analyzer 236. In some embodiments, object analyzer 236 may comprise one or more applications, routines, services, functions or executable instructions of any form or type for analyzing an object obtained from collection plugin 222A. Although not shown, object analyzer 236 may further comprise functions for downloading objects identified by collection plugin 222A, such as a collection agent 214 discussed above. Analyzing an object, as discussed above in connection with solution manager 212, may comprise determining if the object is compliant with a standard syntax and identifying the object, responsive to the determination, as compliant or non-compliant. Accordingly, and as shown, object analyzer 236 may interact with syntax checker 238A. In some embodiments, syntax checker 238A is a separate process, while in others, syntax checker 238A is a function or subroutine of object analyzer 236. In still other embodiments, object analyzer 236 may be a function or subroutine of syntax checker 238A.

Syntax checker 238A may, in some embodiments, comprise one or more applications, routines, services, functions or executable instructions of any form or type for comparing an object to a standard syntax. In some embodiments, syntax checker 238A may comprise associated libraries, dictionaries, databases, or other data structures identifying syntax, functions, connectors, comments, instructions, code, or other objects of one or more languages. For example, in one embodiment, syntax checker 238A may include or be associated with a library defining objects in the Advanced Business Application Programming (ABAP) designed by SAP AG of Walldorf, Germany or using SAP HANA database artifacts. In another embodiment, syntax checker 238A may include a library defining objects in Java, PHP, Python, Perl, SQL, or any other code language. In some embodiments, syntax checker 238A compares code within an object identified by or obtained from collection plugin 222A with code in the library defining objects in a related language. In one example embodiment, syntax checker 238A receives an object from collection plugin 222A that comprises a WRITE command. The syntax checker 238A compares the object to a dictionary, which indicates that the WRITE command has been replaced by a WRITE TO command. Responsive to this comparison, the syntax checker 238A and/or object analyzer 236 identifies the object as being non-compliant. In some embodiments, the identification of an object as compliant or non-compliant may be in a separate object, database, registry, or data structure, while in other embodiments, the identification may be inserted into the object.

As shown, analysis agent 228 may include a download engine 240. Download engine 240 may comprise hardware and/or software components comprising functions or executable instructions for downloading one or more objects and/or identifications of objects as compliant or non-compliant from solution manager 212. In some embodiments, download engine 240 utilizes an RFC user account on solution manager 212 to download objects and/or identifications, as discussed above.

Analysis engine 242 may, in some embodiments, comprise one or more applications, routines, services, functions or executable instructions of any form or type for analyzing a capability of an object for upgrade to a target installation. For example, in one embodiment, an object identified as compliant with syntax of the language of the target installation may be determined to be capable of automatic upgrading and be identified as automatic code 244A. In one such embodiment, the object may need no modifications to be used by the target installation 224. In another such embodiment, the object may be identified as non-compliant, but need only minor modifications. For example, a comment indicator (") used by the language of the source installation may be converted to a comment indicator (#) of the language the target installation without requiring additional analysis. Similarly, a function that included no variables in the source installation, such as CLOSE may be converted to a function that includes optional variables in the target installation, such as CLOSE( ), without requiring additional analysis.

In another embodiment, analysis engine 242 may determine that a non-compliant object needs modifications that may be performed automatically, but also needs modifications that require additional input, such as from a user or developer. This may be referred to as semi-automatic code. For example, in one embodiment, source installation objects may include unicode characters, binary data, or a mix of binary data. In one such embodiment, the target installation may include a function that interacts with objects differently if they are binary or unicode. In such an embodiment, the analysis engine 242 may indicate that some of the objects—those that are solely binary or unicode—may be converted automatically, while objects that are mixed binary and unicode may require a user to designate a mode. In such an embodiment, analysis engine 242 may indicate that the objects are semi-automatic code 244B. In another example, an object of the source installation may contain a function that writes into a database. In one such embodiment, the target installation may have more than one corresponding database. For example, source installation 220 may be a single user environment and have only one user database, while target installation 224 may be a multi-user environment. In some embodiments, the WRITE function may need to have modifications that can be performed automatically, such as the addition of optional variables, or conversion to a WRITE TO statement, and modifications that require input from a user, such as a path to a specific directory or database in the multi-user environment of the target installation. Again, in such an embodiment, analysis engine 242 may indicate that the objects are semi-automatic code 244B.

In another embodiment, analysis engine 242 may indicate that a non-compliant object may not be automatically or semi-automatically converted to the language and/or syntax of the target installation 224, and may identify the object as manual code 244C. For example, a source installation object may use a function of the source installation language that has been obsoleted or for which no corresponding function exists in the target installation. In one such embodiment, the source installation object may read from a common memory. However, in the target installation, a common memory may have been replaced by isolated memory for privacy and security reasons. Accordingly, a READ COMMON function may be obsolete. Upgrading the function or an object using the function may, in such an embodiment, require further input not available to the transformer 230. Responsive to this determination, analysis engine 242 may indicate that the object is manual code 244C.

In further detail of some of the embodiments of automated systems and methods, an object of a source installation may have elements capable of being upgraded, transformed, or converted to a language and syntax of a target installation in a manner essentially independent of additional user, developer input, or other external control. These elements may be referred to as automatic code, or automatic elements. In other embodiments, an object may have elements that are incapable of being upgraded, transformed, or converted to a language and syntax of a target installation in a manner essentially independent of additional user, developer input, or other external control. These elements may be referred to as manual code, or manual elements. In some embodiments, an object may have a combination of both automatic elements and manual elements. In these embodiments, the ratio of elements that are capable of upgrade to elements in the object may used to determine an automation value for the object. In further embodiments, the automation value may be compared to one or more thresholds. For example, if the automation value is equal to or less than a first threshold, the object may be categorized as manual. If the automation value is equal to or greater than a second threshold, the object may be categorized as automatic. If the automation value is greater than the first threshold, but less than the second threshold, the object may be categorized as semi-automatic. In some embodiments, the first threshold may be set at zero, such that an object may be categorized as manual only if it has no elements that are capable of upgrade. In other embodiments, the second threshold may be set at 1, such that an object may be categorized as automatic only if it has no elements that are incapable of upgrade.

In a further embodiment, analysis engine 242 may create a meta-model representative of one or more objects of source installation 220. The meta-model, in some embodiments, may be a syntax tree or abstract syntax tree, and may represent relationships between the one or more objects of the source installation 220. In further embodiments, the meta-model may be presented to a user in either a textual or graphical format. In additional embodiments, the meta-model may contain links to corresponding source code of the one or more objects. In such embodiments, an element in the meta-model may maintain or include a reference to the original source file and line number. In further embodiments, the meta-model may also comprise a mapping of elements to objects. The meta-model, in many embodiments, is a generic structure of nodes, representing objects, and connectors, representing relationships between objects. In such embodiments, the meta-model has no syntax itself and does not correspond to a specific language. In additional embodiments, the meta-model may be used for processing and transforming objects of the source installation into objects usable by the target installation by finding and replacing patterns of connections. In some embodiments, the meta-model may map mutual relationships between objects and characterize relationships as static or dynamic. In such embodiments, a dynamic relationship between objects may change during runtime. For example, a first object may depend alternately on a second object or a third object, responsive to an indicator within a fourth object. When the indicator within the fourth object changes, the first object's dependency likewise changes. In other embodiments, the meta-model may map the relationship of objects to other system entities, such as data elements, operating system programs, system application programs, transactions, environment settings, etc.

In some embodiments, analysis engine 242 may further comprise functions for inserting comments into source code of an object. These comments may indicate suggested modifications to the object or potential errors or warnings if the object is not further modified. For example, as discussed above, an object classified as semi-automatic code 244B may require explicit identification of a working directory on the target installation 224 that does not correspond to a directory existing on source installation 220. Accordingly, analysis agent may add a comment to source code of the object indicating that a user should add explicit identification of a working directory.

Analysis agent 242 may also, in some embodiments, comprise functions or executable instructions for generating a report and/or presenting the report to a user. In these embodiments, the report may include analysis of ratios of automatic code, semi-automatic code, and manual code 244A-244C, and may include descriptions of objects, likelihood of errors when transforming objects, estimated time and/or cost to transform objects, and may include graphs, charts, and/or text. The report may also include a graphical or textual representation of the meta-model.

In additional embodiments, analysis agent 242 may be configured by a user with analysis rules. In these embodiments, analysis rules may be used to ensure that relevant information of interest to the user will be analyzed while increasing efficiency of analysis by ignoring other information. For example, rules may be set to allow analysis of just compliant or non-compliant objects, rather than both sets of objects. In some embodiments, rules may be selected to allow or disallow analysis of objects with unicode violations; analysis of objects that must change with a transformation; analysis of obsoleted objects; analysis of statistics relating to the transformation, such as time and/or cost; and analysis of transformations in specified languages, such as ABAP or Java. As referred to herein, unicode may be source code that complies with syntax and language rules of the target installation. Although referred to as unicode, it does not designate a specific embodiment of unicode, such as the unicode standard for text. Rather, unicode may simply refer to a language utilized by a target or source installation, such as Java, Python, Perl, PHP, or any other type and form of computing language. In additional embodiments, analysis rules may be configured to determine elements in the meta-model that match customer-defined characteristics, such as invocation of customer programs, use of text, specified modification dates, or any other type and form of information relating to or associated with an element.

In some embodiments, the analysis agent 242 may be used outside of a transformation context, to analyze custom code for objects in a source installation as they are being written. For example, the analysis agent may be used to measure whether coding standards are being followed, by determining if an object may be classified as automatic code 244A for transformation to a hypothetical target installation 224 that is identical to source installation 220. A determination that the object is semi-automatic code 244B or manual code 244C may indicate that additional data should be added to the object, such as full path names to directories or explicit indication of ASCII or binary data in a string.

In some embodiments, analysis engine 242 may be configured to detect object clones. An object clone may be objects that are similar to each other or similar to standard objects of the system provided by the application manufacturer. For example, one developer may create an object, such as a current invoices database, with links to customer and sales databases, and another developer may create a similar current invoices database with a different name, due to miscommunication or lack of communication. Although the names are different, the two databases are substantially similar. Future edits or modifications to one database, however, may result in behavior unexpected to a developer who only knows about the other database. Accordingly, an analysis engine may be configured to detect these clones and flag them for removal, modification, transformation, or deletion. In one embodiment, clones may be detected by comparing normalized lines of the object code to create a commonality rating. If the commonality rating exceeds a predetermined threshold, the objects may be considered clones. Similarly, in some embodiments, analysis engine 242 may be configured to detect multiple versions of an object and include only the latest version of the object for transformation.

As shown in FIG. 2C, transformer 230 may include a rule engine 246. In some embodiments, this rule engine may be configured by a configuration agent 232 on configuration client 210. Rule engine 246 may comprise an application, process, agent, function, routine, logic, or any type and form of executable instructions for modifying semi-automatic code 244B in accordance with rules selected or configured by a user using configuration agent 232. For example, as described above, an object classified as semi-automatic code 244B may require explicit identification of a working directory on the target installation 224 that does not correspond to a directory existing on source installation 220. A user may select or configure a rule that identifies a working directory to be added to the source code of the object. Rules engine 246 may then apply this rule and modify the object accordingly. In some embodiments, selecting or configuring rules may be referred to as parameterization.

Objects that are identified as automatic code 244A or have been modified by the rules engine 246 may, in some embodiments, be sent to conversion engine 248. Conversion engine 248 may comprise an application, process, agent, function, routine, logic, or any type and form of executable instructions for transforming objects from a language associated with a source installation to a language associated with a target installation. In many embodiments, rules engine 246 and conversion engine 248 may comprise similar functionality, with conversion engine 248 applying preset or predetermined rules. In such embodiments, conversion engine 248 may comprise or be associated with a database or data structure containing predetermined rules for a language or languages to allow conversion. Unlike rules configured by configuration agent 232 and applied by rules engine 246, rules applied by the conversion engine 248 may, in some embodiments, be unmodifiable by a user. In some embodiments, rule engine 246 and conversion engine 248 may be combined, and may use a single rules database. In further embodiments, configuration agent 232 may be permitted to modify only a subset of predetermined rules in the rules database. One example of a predetermined rule may be a rule indicating that a comment tag from a language associated with a source installation (") may be transformed or modified to a comment tag from a language associated with a target installation (#). Accordingly, in one embodiment of this example, conversion engine 248 may replace comment tags in a source code of an object responsive to the rule.

As shown, transformer 230 may further comprise an upload engine 250. Upload engine 250, similar to download engine 240, may comprise hardware and/or software components for uploading or transferring objects to bridge system 202. In some embodiments and as illustrated, upload engine 250 may upload converted or transformed automatic code and semi-automatic code 244A-244B, and may further upload unconverted manual code 244C. In some embodiments, download engine 240 utilizes an RFC user account on solution manager 212 to upload objects, as discussed above.

Solution manager 212 may further comprise a unicode checker 252 and a syntax checker 238B, as shown in FIG. 2C. Unicode checker 252 may comprise an application, process, agent, function, routine, logic, or any type and form of executable instructions for checking unicode compliance of a transformed object. Similarly, syntax checker 238B may comprise an application, process, agent, function, routine, logic, or any type and form of executable instructions for checking object compliance with syntax of a language associated with target installation 224. In some embodiments, responsive to failure to comply with syntax and/or unicode, solution manager 212 may present warnings or errors to a user. In other embodiments, responsive to failure to comply with syntax and/or unicode, solution manager 212 may send the object back to analysis agent for re-analysis and re-transformation.

Solution manager 212 may comprise a post-processing agent 254. Post-processing agent 254 may comprise an application, process, agent, function, routine, logic, or any type and form of executable instructions for modifying an object, responsive to instructions from a user interacting with manual conversion agent 234, on configuration client 210. In some embodiments, manual conversion agent 234 may comprise an editing application allowing a user to modify source code of an object, and may include features such as automatic recognition of functions of a language; display of comments, such as those inserted by analysis engine 242; and any other features useful to a developer. Although not shown, post-processing agent 254 and manual conversion agent 234 may comprise functionality for communicating over a network to allow a user interacting with configuration client 210 to modify an object stored on bridge system 202. In an example embodiment, an object categorized as manual code 244C may be edited by a user via manual conversion agent 234 and post-processing agent 254 to repair unicode, functions, language features and/or syntax inconsistent with a language associated with target installation 224.

Although not illustrated in FIG. 2C, solution manager 212 or bridge system 202 may further comprise hardware and/or software components for uploading modified and/or post-processed objects to target installation 224.

Figure 2D:
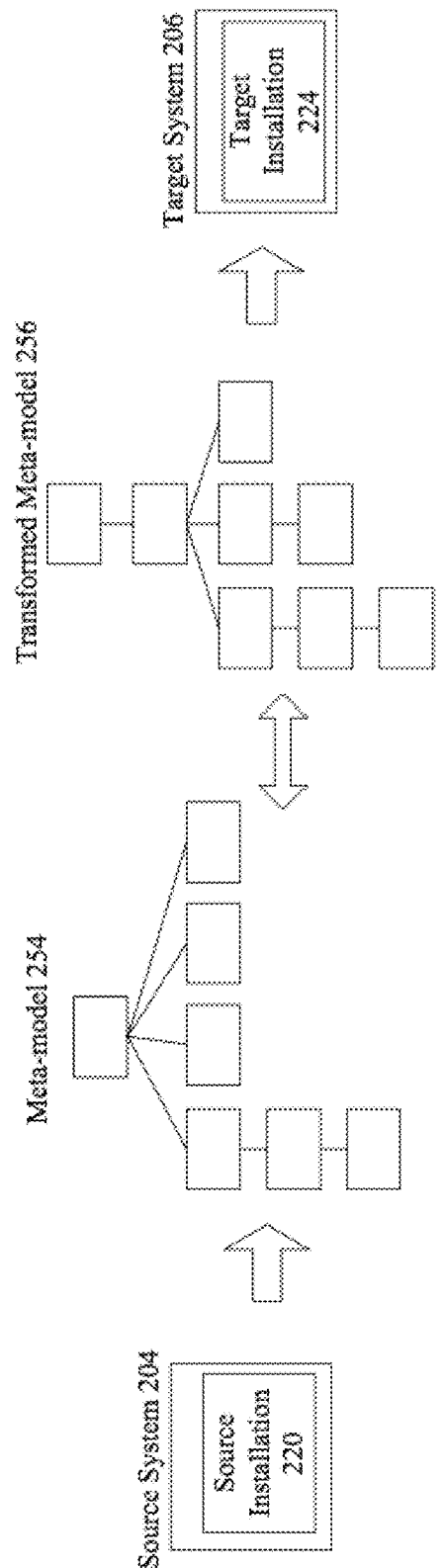
FIG. 2D is a block diagram of an embodiment of an analysis and transformation of a source installation into a target installation.

Referring now to FIG. 2D, illustrated is a block diagram of an embodiment of an analysis and transformation of a source installation into a target installation. As described above, a source installation 220 on source system 204 may be analyzed to create a meta-model 254. As shown, meta-model 254 may comprise objects, or nodes, and links or structure representative of dependencies and interactions between nodes. In some embodiments, the meta-model 254 may be transformed into transformed meta-model 256, responsive to predetermined rules and/or configured rules. For example, in a language associated with source installation 220, a first node representing a function may be dependent on a second node representing an included library of the function. However, in a language associated with target installation 224, the first node representing the function may be dependent on both a second and third node representing two included libraries. Alternately, the first node representing the function may, in the language associated with the target installation 224 have no dependencies due to explicit inclusion of code in the included library. Accordingly, in this example embodiment, transforming the meta-model 254 to transformed meta-model 256 may comprise moving the first node representing the function to a higher level within the abstract syntax tree.

Figure 2E:
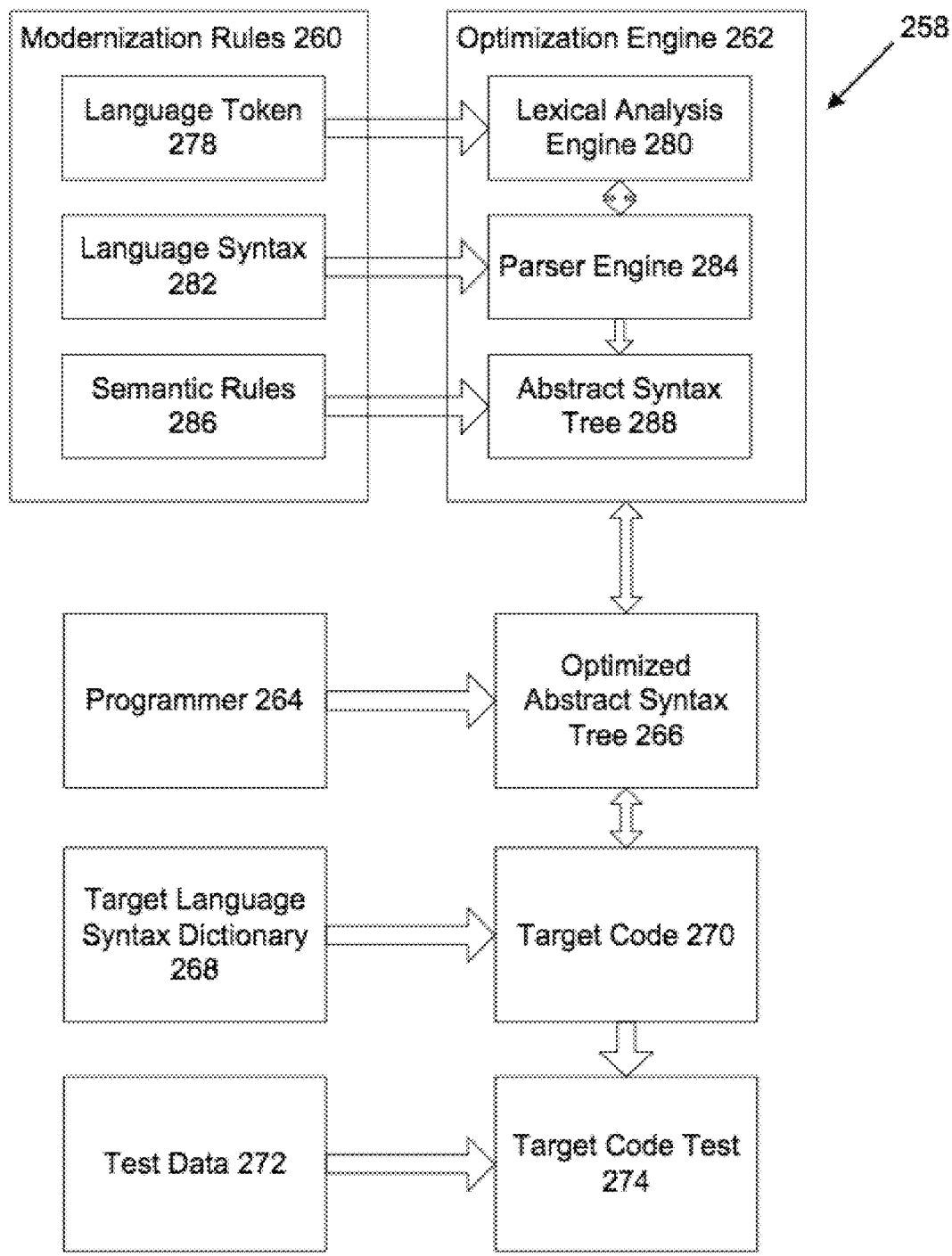
FIG. 2E is a block diagram of an embodiment of a transformation process.

Shown in FIG. 2E is a block diagram of an embodiment of a transformation process 258. In brief, an optimization engine 262 may apply modernization rules 260 to create an optimized abstract syntax tree 266. The optimized abstract syntax tree 266 may be further modified by a programmer 264 to create target code 270, associated with a target language syntax dictionary 268. Using test data 272, the target code may be tested at 274.

Still referring to FIG. 2E and in more detail, modernization rules 260 may include a language token or tokens 278, language syntax 282, and semantic rules 284. A token 278 may be a structured element of code as defined by the source language. For example, in the expression "print=(hello world);", tokens 278 include "print", "=", "(", "hello", " ", "world", ")", and ";". Determining tokens in source code is sometimes referred to as tokenization or tokenizing, and may, in some embodiments, be performed by lexical analysis engine 280, and configured on optimization engine 262. In some embodiments, language tokens 278 may be codified and, in some embodiments, stored in a database, dictionary, or other data structure.

Lexical analysis engine 280 may comprise an application, process, agent, function, routine, logic, or any type and form of executable instructions for locating and interpreting language tokens within source code of an object, as described above.

Language syntax 282 may be a representation of a grammar system within a language. A grammar may, in some embodiments, address location and manipulation of tokens. For example, a token of a semi-colon, used in the above example, may indicate in a language that it is the end of a statement. Tokens after the semi-colon may apply to the following statement, while those before the semi-colon apply to the preceding statement. Language syntax 282 may, in some embodiments, be stored in a database, dictionary, or other data structure. In some embodiments, parser engine 284, configured on optimization engine 262 may use grammar identified by language syntax 282 to parse tokens identified by lexical analysis engine 280. This may be referred to variously as syntactic analysis, semantic parsing, parsing, or analyzing.

As shown, parser engine 284 may comprise an application, process, agent, function, routine, logic, or any type and form of executable instructions for interpreting language tokens located in a source code with language syntax 282 to create an abstract syntax tree 288, also referred to above as a meta-model 254, by applying semantic rules 286. Semantic rules 286 may, in some embodiments, be stored in a database, dictionary or other data structure accessible to parser engine 284. In some embodiments, parser engine 284 may comprise a top-down parser, such as a recursive descent parser, or a Left-to-right, Leftmost derivation (LL) parser. In other embodiments, parser engine 284 may comprise a bottom-up parser, such as a precedence parser, a bounded context (BC) parser, or a Left-to-right, Rightmost derivation (LR) parser.

Using any of the methods or functions described herein, programmer 264 may convert abstract syntax tree 288 to an optimized abstract syntax tree 266. Programmer 264 may, in some embodiments, comprise part or all of analysis agent 228, discussed in more detail above. Optimized abstract syntax tree 266 may be a transformed meta-model 256, discussed above. In some embodiments, optimization of an abstract syntax tree 266 may be performed responsive to semantic rules and language syntax associated with a target language syntax dictionary 268. Objects of a source installation may be transformed to target code 270, responsive to differences between the optimized abstract syntax tree 266 and abstract syntax tree 288.

In some embodiments, test data 272 may be applied to target code 270 for testing purposes 274. In further embodiments, testing may be performed by a user, while in other embodiments, testing may be performed by a service or application identifying errors such as buffer overruns, unescaped loops, and other programming errors.

Figure 3A:
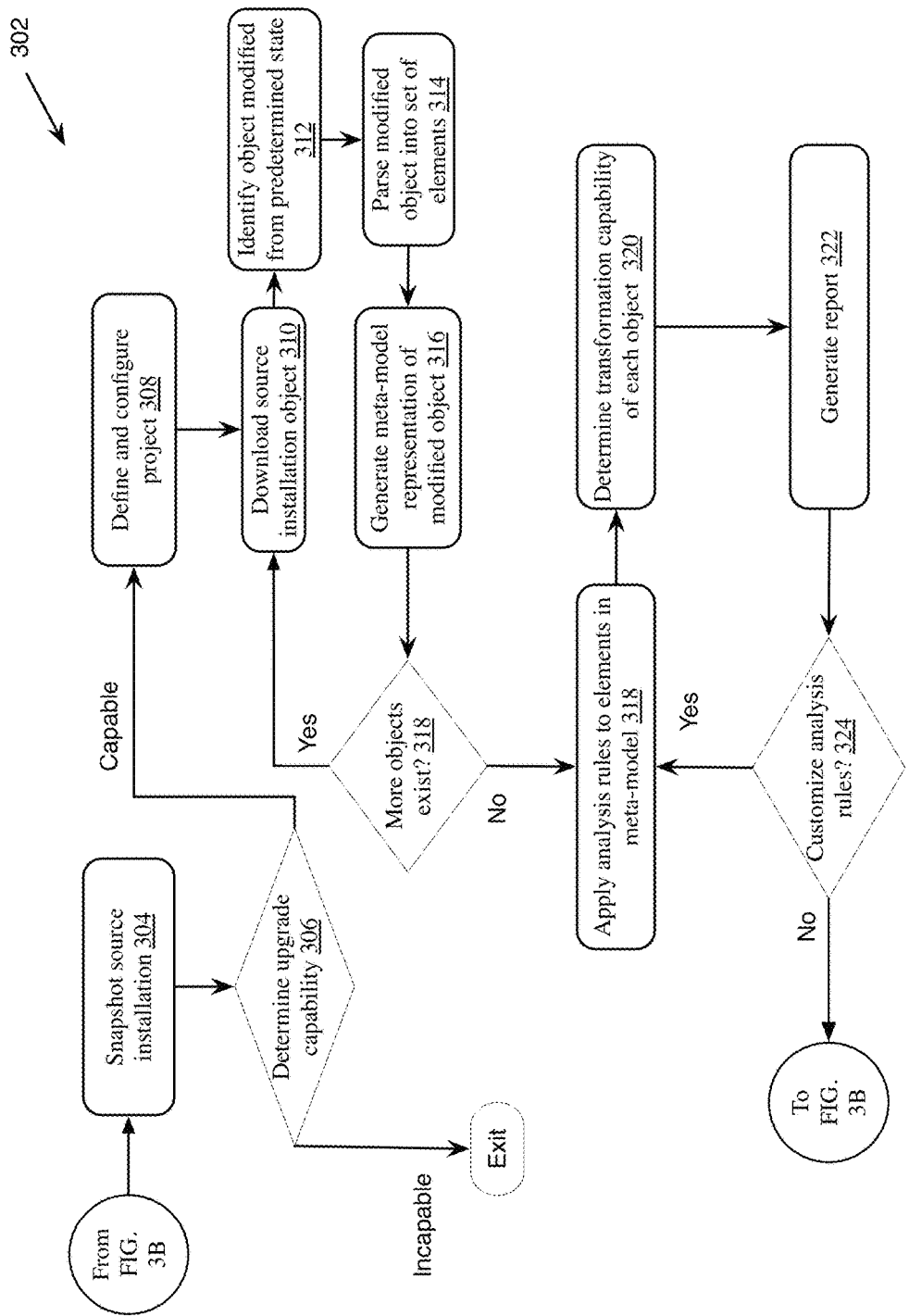
FIGS. 3A-B is a flow chart of an embodiment of a method of analyzing and transforming an application from a source installation to a target installation.
Figure 3B:
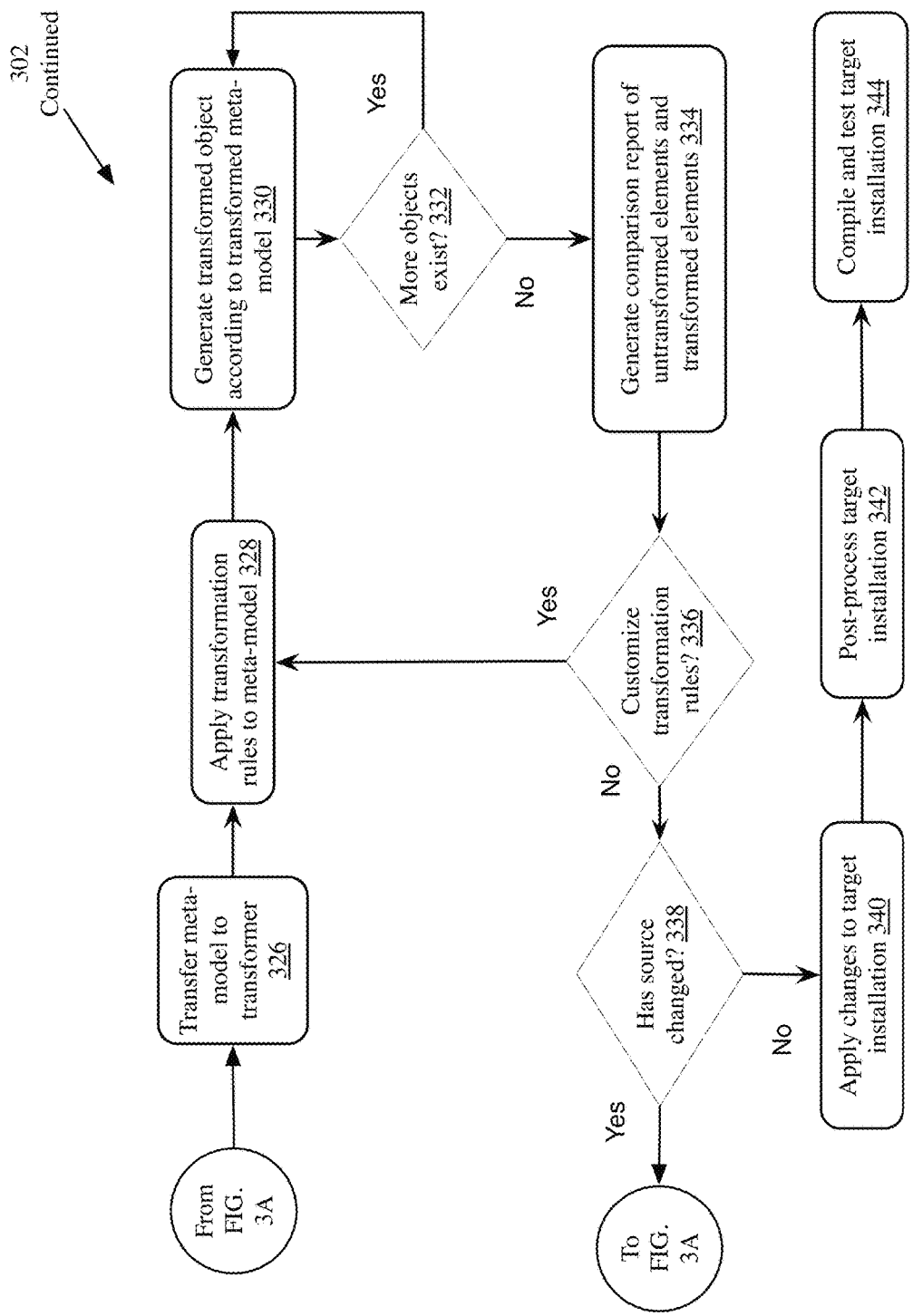

Shown in FIGS. 3A-B is a flow chart, split across two figures for clarity, illustrating an embodiment of a method 302 of analyzing and transforming an application from a source installation to a target installation. In brief, at step 304, a snapshot is taken of a source installation. At step 306, a determination is made as to whether the source installation may be upgraded. If the source installation cannot be upgraded, the method exits and may, in some embodiments, return an error or display further instructions. If the source installation may be upgraded, then at step 308, the project is defined and configured. At step 310, an object may be downloaded from the source installation. At step 312, an identification of the object may be made to determine if it has been modified from a predetermined state. In some embodiments not illustrated, responsive to a determination that the object has not been modified, the object may be discarded, and the method may move to step 318, described below. If the object has been modified, then at step 314, the object may be parsed into a set of elements. At step 316, a meta-model may be generated representing the modified object. At step 318, a determination may be made as to whether more objects exist in the source installation. If so, steps 310-318 may be repeated. In some embodiments, repetition of step 316 may comprise modifying a generated meta-model to include representations of each additional modified object parsed during repetitions of step 314.

At step 318, analysis rules may be applied to each element in the meta-model. At step 320, a determination may be made as to the transformation capability of each object. At step 322, a report may be generated and, in some embodiments, displayed to a user. At step 324, the user may customize analysis rules. If analysis rules have been customized, then steps 318-324 may be repeated. If analysis rules are not customized at step 324, then at step 326, the meta-model may be transferred to a transformer, discussed above. At step 328, transformation rules may be applied to the meta-model to create a transformed meta-model. At step 330, an object may be modified to generate a transformed object, responsive to dependencies and rules associated with the transformed meta-model. At step 332, a determination may be made as to whether more objects exist. If so, steps 330 and 332 may be repeated. If not, then at step 334, a comparison report may be generated comparing transformed objects with their untransformed states. At step 336, a user may customize transformation rules. If the rules are customized, then steps 328-336 may be repeated. At step 338, the snapshot taken at step 304 may be compared with a current state of the source installation. If the source installation has changed, then steps 304-338 may be repeated.

At step 340, transformed objects may be uploaded to the target installation. At step 342, the target installation may be post-processed, which may comprise making additional manual changes to objects uploaded to the target installation. At step 344, the target installation may be compiled and/or tested.

Still referring to FIG. 3A-B and in more detail, at step 304, a snapshot may be taken of a source installation. As described above, in some embodiments, taking a snapshot may comprise storing a copy of one or more objects of a source installation as they exist at a certain time. In further embodiments, only part of the source installation may be snapshotted. For example, in one such embodiment, only customized or modified objects of the source installation may be snapshotted, to save analyzing unnecessary elements.

At step 306, in some embodiments, a determination may be made whether the source installation may be upgraded. For example, in one such embodiment, the source installation may already have been upgraded to the same version as the target installation, and thus not require upgrading. In some embodiments, the source installation and target installation may not be compatible for an upgrade. In some embodiments, the system determines the number of changes, issues or non-compliancy exceed a predetermined threshold for upgrading to the target system.

At step 308, the project may be defined and configured. In some embodiments, defining and configuring the project may comprise selecting a version and/or language for a target installation. In additional embodiments, configuring the project may comprise installing and configuring a target installation in a default or predetermined state, lacking customized objects. In a further embodiment, configuring the project may comprise setting up RFC, Dialog, and Tool user accounts, as discussed above.

At step 310, an object may be downloaded from a source installation, using any of the methods and systems described herein, such as a collection agent and a collection plugin. At step 312, the object may be identified as modified from a predetermined state. In an alternate embodiment not shown, steps 310 and 312 may be reversed, such that objects are identified as modified before they are downloaded. Such an embodiment may allow the system to avoid downloading unmodified objects, as discussed above. In some embodiments, identifying an object modified from a predetermined state may comprise identifying an object that does not exist in a source installation. For example, a custom database may not exist in a default source installation, and accordingly may be considered to be a modified object.

At step 314, the object may be parsed into a set of elements, using any of the methods and systems described herein. For example, an object source code may be tokenized and parsed to determine elements and relationships between elements.

At step 316, a meta-model may be created and/or modified to include the elements and relationships identified at step 314, using any of the methods and systems described above. For example, creating the meta-model may comprise creating an abstract syntax tree representative of the elements and their interrelationships. The system may generate a meta-model for all the elements of the source installation. In some embodiments, the system may generate a meta-model for a portion of elements of the source installation, such as the elements identified as changed from the predetermined state.

At step 318, a determination may be made as to whether more objects and/or modified objects exist in the source installation, and if so, steps 310-318 may be repeated. In some embodiments, this determination may be made by comparing the number of nodes in the meta-model with the number of identified objects in the source installation snapshot. In other embodiments, this determination may be made by failing to locate an additional object or modified object that has not yet been downloaded and parsed.

At step 318, analysis rules may be applied to each element in the meta-model. At step 320, a transformation capability may be determined for each object. For example, an object may be classified as automatic code, semi-automatic code, or manual code, as described above. At step 322, a report may be generated. In some embodiments, applying analysis rules comprises performing the functions described above in connection with the analysis client and/or analysis engine. In additional embodiments, generating a report comprises analyzing statistics of the transformation capability of each object, such as determining ratios of automatic, semi-automatic, and manual code, and determining cost and/or time to perform upgrades, as described above.

At step 324, analysis rules may be customized, and steps 318-324 repeated. For example, responsive to determining that upgrading may be too costly due to a large number of objects to be transformed, a user may modify analysis rules to exclude a portion of the objects. Steps 318-324 may be repeated in some embodiments until the user is satisfied with the outcome indicated by the generated report.

At step 326, the meta-model may be transferred to the transformer. In some embodiments, transferring the model may comprise transmitting the model to the transformer, while in other embodiments, transferring the model may comprise the analysis client instructing the transformer to access the model on a shared memory element.

At step 328, the transformer may apply transformation rules to the meta-model to generate a transformed meta-model, using any of the systems and methods discussed herein. In one embodiment, applying transformation rules may comprise locating a pattern in the meta-model corresponding to an entry in a transformation rule database. In a further embodiment, applying transformation rules may comprise modifying an abstract syntax tree according to a rule associated with an entry in a transformation rule database. For example, in one such embodiment, the transformer may determine that a first element is dependent on a second element. The transformer may further determine that the second element is a function call, such as a WRITE instruction. The transformer may locate a rule in the rule database associated with target installation language matching a first element dependent on a WRITE instruction, and apply the rule to modify the WRITE instruction to a WRITE TO instruction.

At step 330, in some embodiments, the transformer may generate a transformed object according to the transformed meta-model. In some embodiments, generating a transformed object comprises modifying a source object. In other embodiments, generating a transformed object comprises generating a new object. In one embodiment, a transformed object may be generated responsive to transformation rules, discussed above. For example, an object including code representing a WRITE instruction, as discussed at step 328, may be modified to include code representing a WRITE TO instruction. Further changes may be made responsive to transformation rules and/or the transformed meta-model. For example, a first object dependent on a second object in the original meta-model may be dependent on a third and fourth object in the transformed meta-model. Accordingly, at step 330, the transformer may replace, in source code of the first object, references to the second object with references to the third and/or fourth object. In an example of one such embodiment, in a source installation, a first object comprising a human resources database, may be dependent on another object comprising an organizational hierarchy. However, in the transformed meta-model, the human resources database may further comprise organizational hierarchy and not be dependent on a second object. Accordingly, in this example embodiment, the transformer may modify the first object to further comprise fields indicating levels and interconnections previously described in object comprising the organizational hierarchy. In further embodiments, generating a transformed object may comprise generating an object that possesses desired characteristics defined by the transformation rules, such as being free of syntax violations and/or naming convention errors, or any other type of characteristic of a source code that may be desired by a user.

At step 332, a determination may be made if more objects exist, using similar methods to those described above at step 318. If so, steps 330-332 may be repeated.

At step 334, a comparison report may be generated. In one embodiment, a comparison report comprises a comparison of untransformed elements and/or objects and transformed elements and/or objects. In a further embodiment, the comparison report may be displayed or presented to a user. For example, in an embodiment of the example discussed above at step 330, a report may be generated showing (a) the first object comprising the human resources database with source code showing dependency on the second object comprising the organizational hierarchy; and (b) the first object comprising the human resources database with source code showing no dependency on the second object, but rather including additional data representing the hierarchical levels and interconnections.

At step 336, the user may customize the transformation rules. In some embodiments, this may be done for increasing efficiency, adjusting for undesired behavior, or any other reason. Referring to the example discussed above at step 334, a user may decide that it is preferable to maintain the separate human resources database and organizational hierarchy, and may adjust the transformation rules to exclude or disable this transformation. In another example, an organization may be expanding simultaneously with upgrading, and may be adding additional manufacturing locations. In such an example, a user may modify the transformation rules to incorporate the additional resources for each new manufacturing location, such as additional inventory databases, additional shipping locations, or any other type and form of resource or object. In some embodiments, if the user has customized or modified the transformation rules, steps 328-336 may be repeated.

At step 338, the analysis client may determine if the source installation has changed since the snapshot was taken. This could occur, for example, if analysis, transformation, and customization have taken a significant amount of time. If so, steps 304-338 may be repeated. In some embodiments, repeating steps 304-338 may comprise repeating steps 304-338 only on objects that have been modified in the source installation since the previous snapshot. These embodiments may reduce analysis, transformation, and customization time greatly, as only objects that have changed will need to be re-analyzed and transformed. In further embodiments, transformed objects that have not changed in the source installation may be stored on a storage element until the determination at step 338 indicates that no further changes have occurred in the source installation.

Responsive to no further changes having occurred in the source installation since the previous snapshot was taken, at step 340, the object transformations may be applied to the target installation. In some embodiments, applying the transformations may comprise uploading or transmitting transformed elements and/or objects to the target installation, using any of the methods or systems discussed herein.

At step 342, the target installation may be post-processed. In some embodiments, post-processing the target installation may comprise editing manual or semi-automatic code, as discussed above. In additional embodiments, post-processing the target installation may comprise optimizing the installation. For example, optimization may include compressing the installation, removing unnecessary comments and/or code, cleaning up or removing unused variables, or any other type and form of source code optimization.

At step 344, the target installation may be tested. In some embodiments, step 344 may further comprise compiling the target installation. In other embodiments, the target installation does not require compiling, for example, if all objects are XML objects. In some embodiments, testing the target installation comprises installing test data to the target installation, performing modifications to objects and databases, and verifying expected results. In some embodiments, responsive to errors during testing, one or more steps of method 302 may be repeated, for example steps 328-344.

Although discussed in terms of source installations and target installations, in many implementations, transformation or upgrading may be done on a portion of an installation, such as a module or other subset of a system. For example, in one implementation, a company may begin with a clean target installation of a new version of a system, and transform and migrate a subset of objects or code from a source installation, discarding or not transforming obsolete code modules or objects. This may be done periodically or during an upgrade to remove unused portions of code, for example.

As discussed above, these methods of using a cloud service for application transformation provide both flexibility in deployment and advantages in parallel and concurrent processing and transformation of objects of the application. This may reduce the need for customers of the application transformation service to supply local infrastructure, and allow the service to support the needs of multiple customers simultaneously.

C. Systems and Methods for Automatically Transforming Reporting and View Database Schema During Upgrading of a System from a Source Installation to a Target Installation As discussed above, in many instances, as custom objects are modified, custom interfaces or applications such as views and reports that read and/or write data to and from custom objects may need to be similarly modified in order to remain functional. These customizations may be complex as various objects are split or joined relative to the source installation during transformation. Both the structure of and associations between objects (sometimes referred to as a schema, such as a database schema, report schema, view schema, or by other similar terms) may be modified via an automated transformation process. For example, tables may be merged with one table becoming a subset of another, or may be split; fields associated with one table may become associated with a different table or subset of a table; or other similar modifications may be made.

The systems and methods described herein also provide for automatically transforming reporting and view schema during upgrading or transformation of a system from a source installation to a target installation. In some implementations, transforming the schema may restore functionality lost during upgrading the system or prevent loss of functionality due to changes in the underlying system and/or custom code objects. In other implementations, the transformation may provide for faster database access by reports or views or other applications, or may reduce a memory footprint, bandwidth requirement, or processor utilization. For example, in one implementation, new functions may be added to report or view applications during transformation to provide more efficient interaction, such as loading a portion of a query result into memory (e.g. a portion that may be displayed on screen at one time, such as the first 50 rows of results of a table query) rather than the entire query result (which may require significantly more storage space). The transformation system may analyze the structure of queries in applications in the source installation, identify the associated objects or tables, and modify the query and/or associations to create a new combination providing enhanced functionality.

Figure 4A:
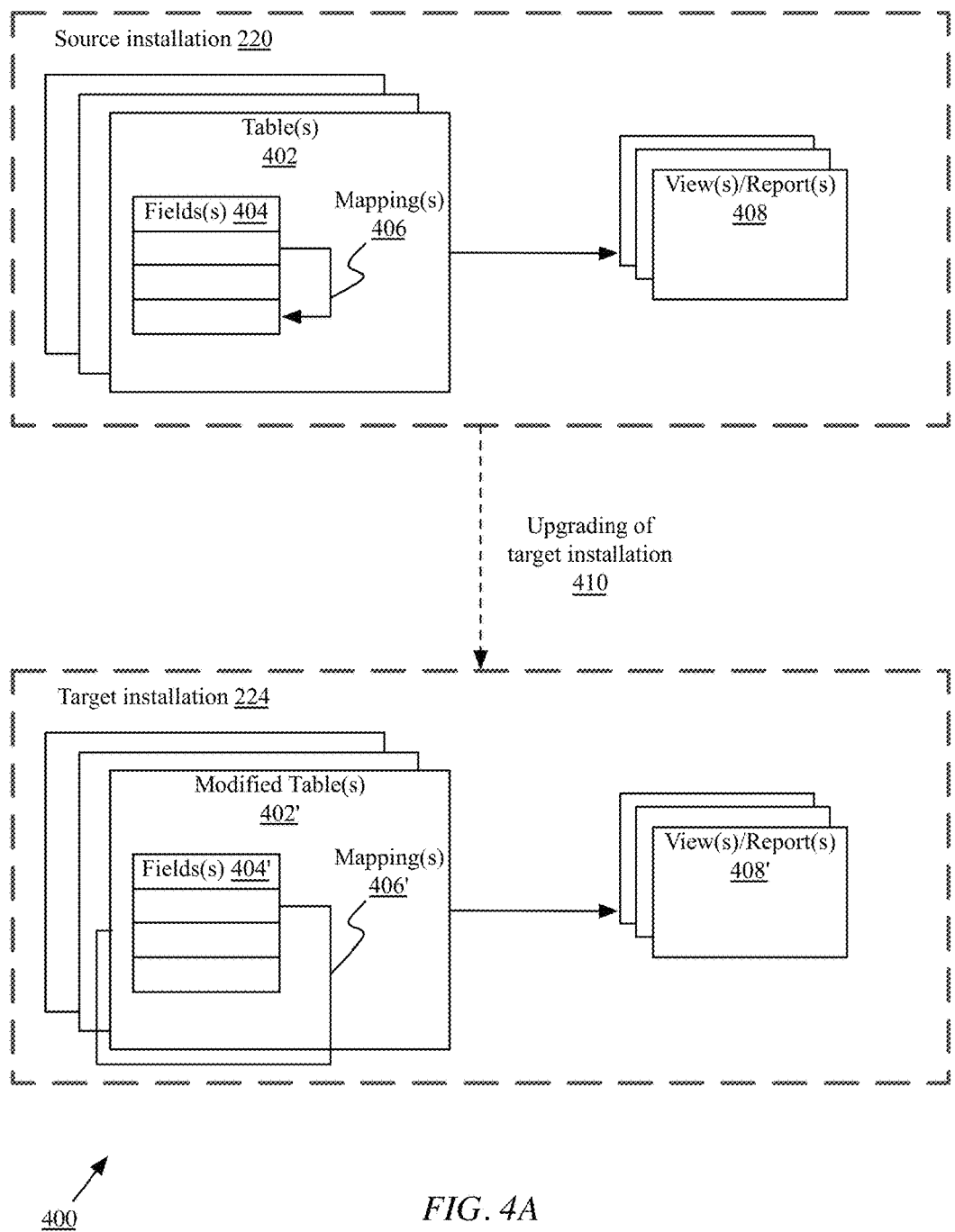
FIG. 4A is an illustration of transforming database schema for reports and views by remapping tables and fields during upgrade, according to one implementation.

FIG. 4A is an illustration of transforming database schema for reports and views by remapping tables and fields during upgrade 410 from a source installation 220 to a target installation 224, according to one implementation. As discussed above, upgrading 410 may comprise identifying custom objects; generating a meta-model; classifying code or objects as automatic, semi-automatic, or manual; transforming the meta-model to meet requirements of the target installation; and applying changes to automatic and semi-automatic objects. Such objects may include tables 402 and/or fields of tables 404. Although primarily discussed in terms of fields and tables, a table 402 may refer to any database or array or similar data structure, and a field 404 may refer to any corresponding entry in a database or array or data structure, such as a field, string, value, cell, record, or other such object. Accordingly, a table 402 may comprise a container or structure for one or more data records or fields 404. The table may comprise a schema, comprising a structure for the table and associations between the table and other tables, and/or between fields of the table (intra-table associations or mappings) and/or fields of other tables (inter-table associations or mappings). Generally, tables, fields, records, strings, entries, keys, user interface screens, electronic data exchanges (e.g. files, RFC communications, electronic data interchange (EDI) communications, intermediate document (IDoc) exchanges, etc.), and other such entities or elements may be referred to as data sources.

As discussed above, mappings 406 may refer to explicit or implicit associations between fields, keys, or other data structures. For example, two fields 404 in different tables 402 may be of the same type or have the same value, such as a username, account identifier, SKU, etc. These mappings may be explicit, such as a field or sub-field identifying a corresponding other field or sub-field in another record or table; or may be implicit, such as where both fields have the same type, title, or identifier. Mappings may be accordingly referred to as associations, relationships, correspondences, or by any other similar term.

During upgrade 410 of a source installation to a target installation, in many instances, tables 402 may be split, merged, joined, coalesced, concatenated, or otherwise modified. Accordingly, fields 404 in these modified tables 402' may also be modified, such as merged fields that merge, coalesce, or combine corresponding records from different tables; fields renamed to comply with target installation rules such as unicode compliance or case-sensitivity; fields moved to new tables as a result of merging or splitting of tables, etc. Mappings between fields may accordingly be changed, with new mappings created; old mappings removed; or mappings modified to identify new field locations. For example, as a result of joining two tables, each including a user identifier field that are related, the mapping between the two fields may be obviated as the fields are merged.

As discussed above, an analyzer client may generate a meta-model of tables 402, fields 404, and mappings 606 between the fields and tables; and may identify a transformation of the meta-model to correspond to the modified objects of the target installation. The transformation may be applied to the tables, fields, and/or mappings to generate corresponding modified tables, fields, and/or mappings, and accordingly, the transformation may comprise a set of change instructions for each object and/or association between objects.

Referring briefly ahead to FIG. 4C, illustrated is an example of remapping or modification of tables for automated transformation of reporting schema, according to one implementation. The illustrated table defines a semantic data model or meta-model of the source installation and modifications required to transform the model for deployment with the target installation. In the illustrated example, various tables 402 and keys 436 of the table are associated with views or reports 430. Table identifiers 431 are included for reference during transformation, but may not correlate with table names or other identifiers. In a source installation, each view may include queries, outputs, interface elements, or other modules that are associated with objects such as tables 402, keys 436, and/or fields of tables 402. As noted above, during transformation of the source installation to the target installation, tables 402 may be modified, merged, obsoleted, or otherwise changed. A transformed meta-model may be created to indicate the change and output code generated based on the transformation. In the illustrated example, an accounting item list view may have included queries (e.g. select clauses including "where" conditions identifying specific tables or data fields within tables) from four tables 402 as shown, with similar keys 436. During transformation, these tables may be merged or joined (as shown in associated modified tables or merges 432A-432C) such that queries can be directed to a single table, decreasing storage and memory requirements while increasing efficiency. In some implementations, tables (and/or other objects) may be associated or joined, which may be similar or distinct operations, depending on implementation. For example, in one implementation, a join may comprise generating a single result set from two or more sets (e.g. columns or rows) of database entries. An association may comprise associating the sets without explicitly merging them or generating a single output, such that operations may be performed on the combined set (e.g. iteratively, on each portion). A join may be a subset of an association or a result of execution of an association, for example, or an association may retain distinct identities of data sets for readability or ease of maintenance.

Output code 434 may be generated to indicate how the keys 436 are remapped to the modified tables. Similarly, an accounting item payment report 430 may include a query for transaction identifiers, valuation areas, and flow numbers that may have previously been associated with a table 402 but are distributed through different tables in a modified target installation. Corresponding output code 434 may therefore include a plurality of remapping instructions.

Similarly, FIG. 4D is an illustration of an example of remapping or modification of fields for automated transformation of reporting schema, according to one implementation. Fields 438 mapped to or associated with source tables 437 may be maintained or remapped as tables are modified, resulting in either a new similar field or new field identified in output 440. As shown, in some implementations, table identifiers 431 may be used to distinguish source tables 437. Each data element 442 associated with the mapped field may be further identified. In some implementations, additional information, such as field descriptions 444 may be included in the model for ease of maintenance and review.

FIG. 4E is an example of output transformation code 446 based on the examples of FIGS. 4C and 4D, according to one implementation. The code snippet illustrated is merely a subset of code that would be generated from the table and field mappings of FIGS. 4C and 4D, but may be helpful for understanding the transformation. A header 448 may provide metadata for the transformation code, including identification of compiler types, labels, permission or authorization control, etc. The transformation code 446 may include instructions to transform table objects 450, such as merging or join tables as shown. Each definition and join statement corresponds to a row within the table mappings illustrated in FIG. 4C. Similarly, transformation code 446 may include instructions to define or remap fields or keys of tables 452 as shown.

Figure 4B:
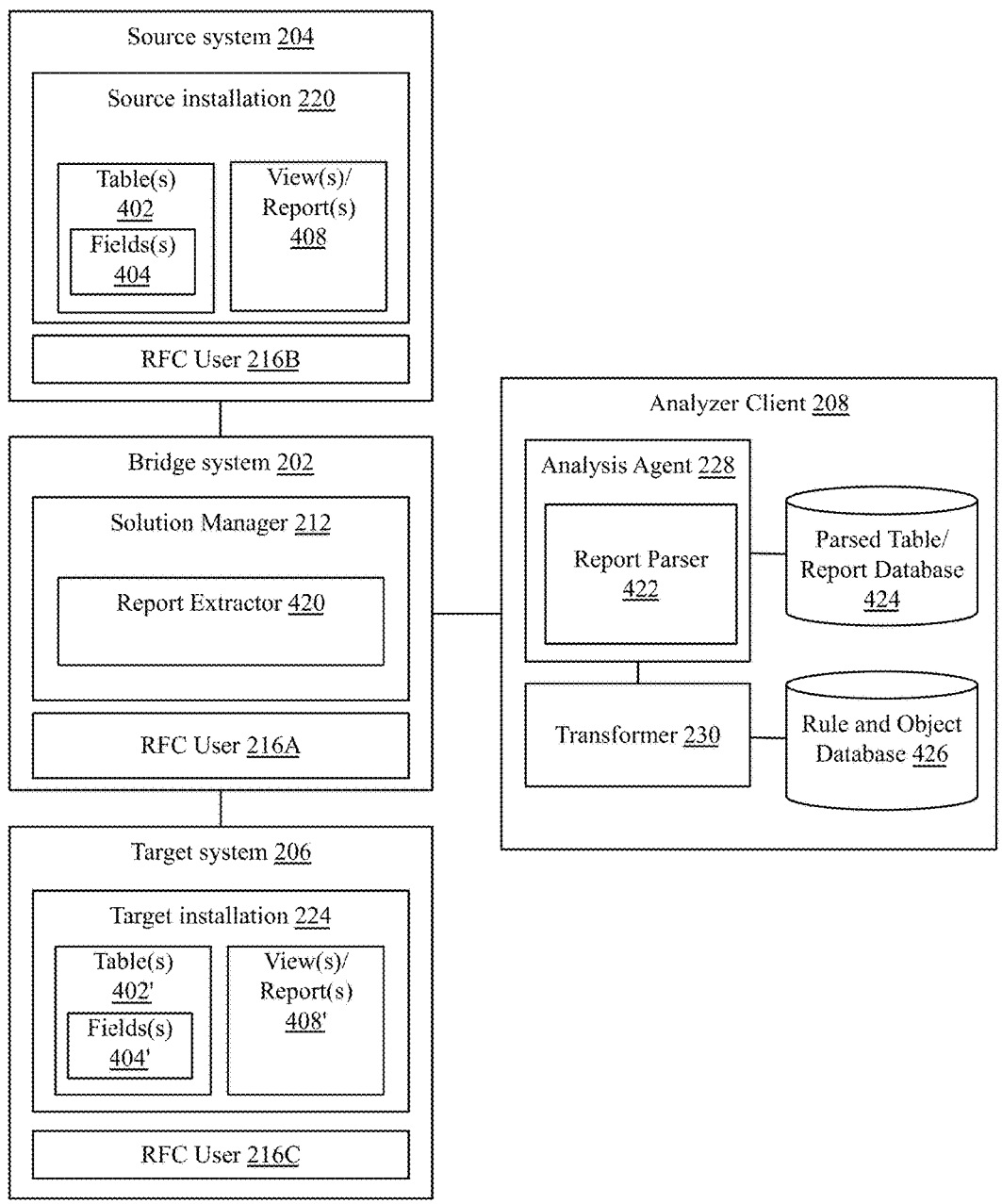
FIG. 4B is a block diagram of an implementation of a system for automated transformation of reporting schema.

FIG. 4B is a block diagram of an implementation of a system for automated transformation of reporting schema. As shown, many implementations utilize components discussed above, such as a bridge system 202, source system 204, target system 206, and analyzer client 208; source installation 220 and target installation 224; RFC Users 216A-216C; solution manager 212; analysis agent 228; and transformer 230. Although not shown, in many implementations, other components illustrated in FIGS. 2A-2C and discussed above may be included.

In some implementations, a solution manager 212 of a bridge system 202 may comprise a report extractor 420. Report extractor 420 may comprise an application, service, server, daemon, routine, or other executable logic for identifying and retrieving reports, views, or other applications from a source installation and their associated mappings, associations, or object relationships. In some implementations, report extractor 420 may be configured for applying transformation code to modify the applications for a target installation.

In some implementations, an analysis agent 228 of an analyzer client 208 may include a report parser 422. Report parser 422 may comprise an application, server, service, daemon, routine, or other executable logic for identifying and analyzing objects of a source installation queried by a report, view, application, or other interface to determining mappings, associations, or other relationships between objects or sub-objects (e.g. fields or keys of a table, or other such entities). Parsing the objects may comprise identifying values, types, identifiers, names, strings, or other characteristics of the objects, including each object's relationships or associations with other objects (e.g. hierarchical associations, explicit mappings or associations, etc.). Based on the identifications by report parser 422, the analysis agent may generate a meta-model for the objects queried by the report or view as discussed above, including identifications of the mappings or relationships. The meta-model may be stored in a report database 424, which may comprise a table, spreadsheet, array, database file, SQL file, JavaScript Object Notation (JSON) file, or any other type and form of data structure.

As discussed above, once the report is parsed and a meta-model generated, the transformer 230 may apply transformations to the objects to convert the meta-model to a modified model for the target installation 224. The transformations to objects may be based on transformations to objects or code performed during upgrading of the source installation, including automatic objects and semi-automatic objects, performed by the transformer 230, as well as manual changes made by a user or administrator to objects classified as manual objects. The transformations may thus be based on predetermined rules, rules set by a user for conversion of semi-automatic code, and manual transformation instructions. These rules may be stored in a rule and object database 426, which may comprise a data file, flat file, array, relational database, XML file, or any other type and form of data structure.

Figure 4F:
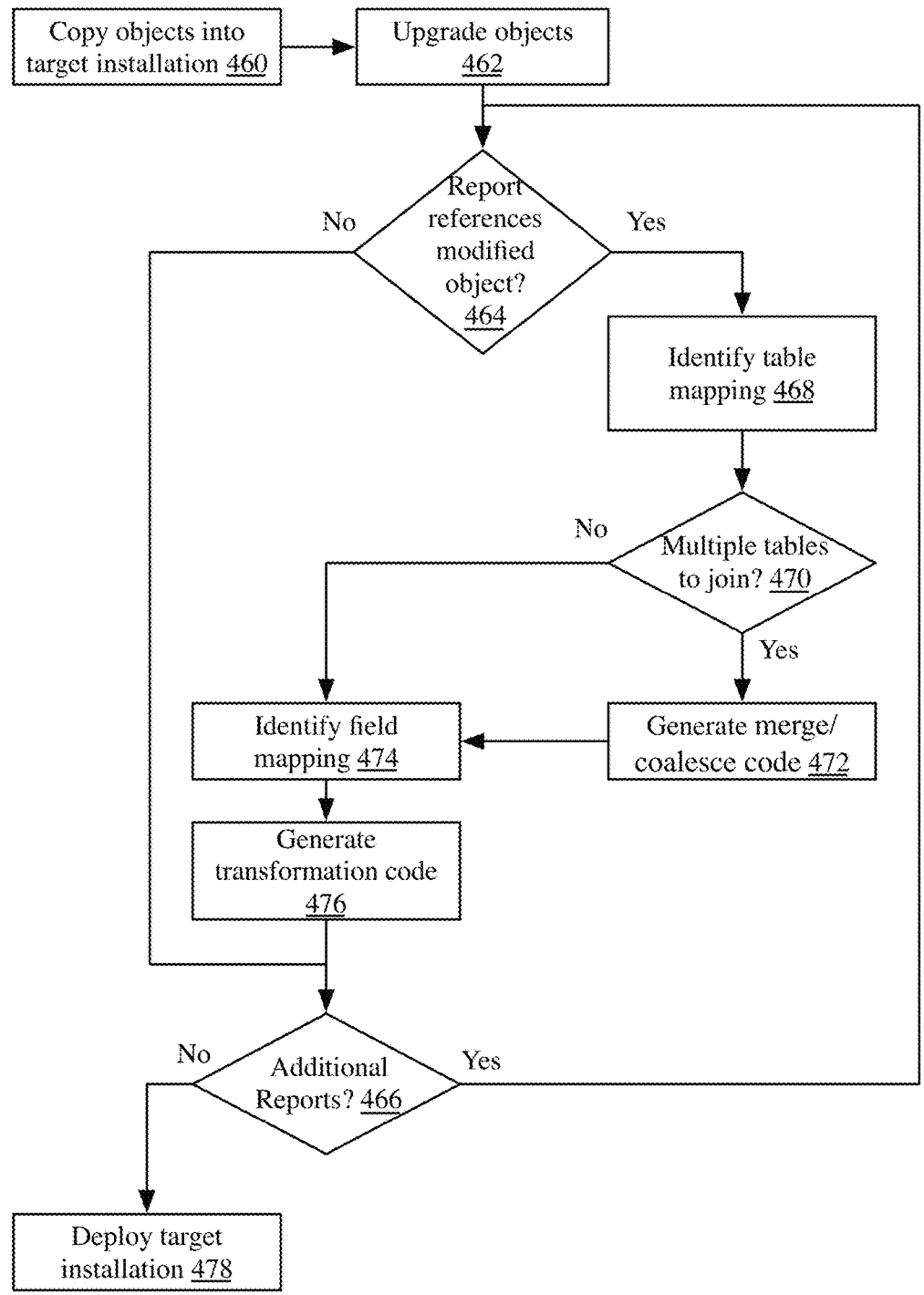
FIG. 4F is a flow chart of an implementation of a method for automated transformation of reporting schema.

FIG. 4F is a flow chart of an implementation of a method for automated transformation of reporting schema. At step 460, objects may be copied into a target installation, and at step 462, the objects may be transformed or upgraded as discussed above. As discussed above, objects may comprise data sources, tables, fields, keys, function calls, interactive user interface elements such as user interface screens, electronic data exchanges (e.g. files, RFC, EDI, or IDoc communications, etc.), variables, or other such entities. At step 464, in some implementations, a report extractor or analyzer client may retrieve an unmodified report, view, application, or other interface element, referred to generally as a report, from the target installation. The client may retrieve the report via any means discussed above, including via an RFC login, file transfer, or other such method. The analyzer client or parser may analyze the report to determine whether the report includes a query for an object or sub-object modified at step 462. The modification may include a modification to the object as discussed above, or a modification to a relationship between the object and another object or sub-object. If the report includes no queries or references to modified objects, then at step 466, the client or report extractor may determine if additional reports exist in the source installation. If not, then at step 478, the report may be deployed to or enabled in the target installation, as discussed above.

If the report does reference or query a modified object, then at step 468 in some implementations, the analyzer or report parser may identify a mapping between the object of the source installation and the modified object of the target installation. As discussed above, the mapping may include mappings between data sources, including changes to a table of the source installation for deployment in the target installation. The modifications to the meta-model or remapping may be stored in a mapping table or structure as discussed above.

In some implementations, the modification to a data source, table, or object may include merging, joining, or coalescing a plurality of data sources, tables, or objects of the source installation. The analyzer may determine if data sources are to be joined or merged at step 470, and if so, at step 472, may generate merging or coalescing code to join the data sources. The data sources may be joined via any suitable method, including merging, coalescing, concatenating, determining an intersection of the data sources, or any other such method. The generated code may identify the operation to be performed by the transformer and parameters such as object names, portions of objects to be merged, permissions, client values, table identifiers, or any other type or characteristic. Similarly, in some implementations, a data source of the source installation may be split for the target installation. A similar process to steps 470-472 may be performed for splitting data sources, as discussed above.

At step 474, in some implementations, the analyzer or parser may identify sub-objects or mappings or associations between sub-objects, such as fields or keys of a table, that are modified from the source installation. The analyzer or parser may similarly generate an identification of sub-object remappings, including changes to fields or intra-table or inter-table associations between fields. The modifications to the meta-model or remapping between sub-objects may be similarly stored in the mapping table or structure as discussed above.

At step 476, the analyzer or parser may generate transformation instructions for transforming the objects or sub-objects referenced by the report according to the modified meta-model. The transformation instructions may identify object renaming instructions, merge or join instructions, identifications of entities to be associated, or any other such instructions, as discussed above. In many implementations, the instructions may be based on automatic or semi-automatic object conversion rules generated during transformation or upgrading of the source installation to the target installation. The instructions may be stored to be reapplied to additional reports or entities as required.

In some implementations, at step 466, the report extractor or analyzer client may determine if additional reports exist. If so, then steps 464-476 may be repeated iteratively. Once all reports have been analyzed and transformation instructions generated, a transformer of the analyzer client may execute the transformation instructions to modify the reports and/or objects or sub-objects. Queries within the reports may be automatically modified by the transformer according to the new associations, tables, or fields. For example, queries may be rewritten to refer to modified or merged tables and fields rather than the unmodified tables and fields of the source installation. In some implementations, the transformer may further generate a report or change log identifying modifications to the reports for review by an administrator. As discussed above, the transformation instructions may be stored for re-execution on additional reports as necessary, such as where further reports are generated by end-users using an online system, during offline transformation or upgrading of a copy of the target installation. This may reduce analysis and parsing requirements for further reports.

Thus, the systems and methods discussed herein provide for automatically transforming reporting schema. In a first aspect, the method includes identifying, by an analyzer executed by a processor of a client device, an application of a source installation configured to process a first one or more objects of the source installation. The method also includes determining, by the analyzer, that the first one or more objects are modified during upgrading, conversion, or transformation of the source installation to a target installation. The method further includes generating, by the analyzer, a mapping between the first one or more objects of the source installation to a second one or more objects of the target installation, responsive to the determination. The method also includes modifying a schema of the application, by a transformer executed by the processor of the client device, according to the generated mapping.

In some implementations, the method includes determining that a query of the application is associated with a pre-modified object of the first one or more objects. In other implementations, the method includes identifying an association between a first data source of the source installation and a second data source of the second installation. The data sources may comprise tables, fields, keys, user interface inputs, variables, function call responses, strings, entities, objects, executable code, functions, names, identifiers, user interface screens, electronic data exchanges (e.g. files, RFC, EDI, or IDoc exchanges, etc.), or any other such data source, and may be of the same type or different. In a further implementation, the method includes identifying an association between a third data source of the source installation and the second data source. In a still further implementation, the method includes joining the first data source and third data source of the source installation. In another further implementation, the method includes identifying a field common to the first data source and second data source. In still another further implementation, the method includes identifying a first field of the first data source associated with a second field of the second data source.

In some implementations, the method includes comprises generating transformation instructions or a script comprising an identification of an object of the source installation and a corresponding object of the target installation and a join or association command, according to the generated mapping. The transformation script may be executed by a transformer to modify the application to reference modified objects, according to the mappings. In a further implementation, the object of the source installation comprises a field of a first data source, and the object of the target installation comprises a field of a different second data source.

In another aspect, the present disclosure is directed to a system for automatically transforming reporting schema. The system includes an analyzer client, in communication with a source system comprising a source installation and a target system comprising a target installation, comprising a processor executing an analyzer and a transformer. The analyzer is configured to identify an application of the source installation configured to process a first one or more objects of the source installation; determine that the first one or more objects are modified during upgrading or transformation of the source installation to a target installation; and generate a mapping between the first one or more objects of the source installation to a second one or more objects of the target installation, responsive to the determination. The transformer is configured to modify a schema of the application according to the generated mapping.

In some implementations, the analyzer is further configured to determine that a query of the application is associated with a pre-modified object of the first one or more objects. In another implementation, the analyzer is further configured to identify an association between a first data source of the source installation and a second data source of the second installation. In a further implementation, the analyzer is further configured to identify an association between a third data source of the source installation and the second data source. In a still further implementation, the transformer is further configured to join the first data source and third data source of the source installation. In some implementations, the analyzer is further configured to identify a field common to the first data source and second data source. In other implementations, the analyzer is further configured to identify a first field of the first data source associated with a second field of the second data source.

In some implementations, the transformer is further configured to generate a transformation script comprising an identification of an object of the source installation and a corresponding object of the target installation and a join or association command, according to the generated mapping. The transformation script may be executed by the transformer to modify the application to reference modified objects, according to the mappings. In a further implementation, the object of the source installation comprises a field of a first table, and the object of the target installation comprises a field of a different second table.

While various embodiments of the methods and systems have been described, these embodiments are exemplary and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the exemplary embodiments and should be defined in accordance with the accompanying claims and their equivalents.

What is claimed:

1. A method for automatically transforming reporting schema, comprising:
    identifying, by an analyzer executed by a processor of a client device, an application of a source installation configured to process a first one or more objects of the source installation;
    determining, by the analyzer, that the first one or more objects are modified during transformation of the source installation to a target installation;
    generating, by the analyzer, a mapping between the first one or more objects of the source installation to a second one or more objects of the target installation, responsive to the determination, by:
        identifying an element common to a first data source of the source installation and a second data source, different from the first data source, of the target installation, and
        determining that the first data source should be mapped to the second data source responsive to the identification of the common element;
    generating a transformation script comprising an identification of an object of the source installation and a corresponding object of the target installation and a join or association command, according to the generated mapping; and
    modifying a schema of the application, by a transformer executed by the processor of the client device executing the transformation script, according to the generated mapping;
    wherein the object of the source installation and the object of the target installation are different objects.

2. The method of claim 1, wherein determining that the first one or more objects are modified during transformation further comprises determining that a query of the application is associated with a pre-modified object of the first one or more objects.

3. The method of claim 1, wherein the first data source is one of a table, field, key, user interface input, variable, user interface screen, electronic data exchange, or function call response.

4. The method of claim 1, further comprising identifying an association between a third data source of the source installation and the second data source.

5. The method of claim 4, wherein modifying the schema of the application further comprises joining the first data source and third data source of the source installation.

6. The method of claim 1, wherein identifying the association between the first data source and the second data source further comprises identifying a first field of the first data source associated with a second field of the second data source.

7. A system for automatically transforming reporting schema, comprising:
    an analyzer client, in communication with a source system comprising a source installation and a target system comprising a target installation, comprising a processor executing an analyzer and a transformer;

wherein the analyzer is configured to:
  identify an application of the source installation configured to process a first one or more objects of the source installation,
  determine that the first one or more objects are modified during transformation of the source installation to a target installation, and
  generate a mapping between the first one or more objects of the source installation to a second one or more objects of the target installation, responsive to the determination, by:
    identifying an element common to a first data source of the source installation and a second data source, different from the first data source, of the target installation, and
    determining that the first data source should be mapped to the second data source responsive to the identification of the common element, and
  generate a transformation script comprising an identification of an object of the source installation and a corresponding object of the target installation and a join or association command, according to the generated mapping; and
wherein the transformer is configured to:
  execute the transformation script to modify a schema of the application according to the generated mapping; wherein the object of the source installation and the object of the target installation are different objects.

8. The system of claim 7, wherein the analyzer is further configured to determine that a query of the application is associated with a pre-modified object of the first one or more objects.

9. The system of claim 7, wherein the first data source is one of a table, field, key, user interface input, variable, user interface screen, electronic data exchange, or function call response.

10. The system of claim 7, wherein the analyzer is further configured to identify an association between a third data source of the source installation and the second data source.

11. The system of claim 10, wherein the transformer is further configured to join the first data source and third data source of the source installation.

12. The system of claim 7, wherein the analyzer is further configured to identify a first field of the first data source associated with a second field of the second data source.

13. The system of claim 7, wherein the object of the source installation comprises a field of a first table, and the object of the target installation comprises a field of a different second table.

* * * * *